(12) United States Patent
Howard et al.

(10) Patent No.: US 7,716,485 B2
(45) Date of Patent: May 11, 2010

(54) SYSTEMS AND METHODS FOR MEDIA AUTHENTICATION

(75) Inventors: Daniel G. Howard, Mashpee, MA (US); Jeffrey A. Pagliarulo, West Barnstable, MA (US); John R. Crowley, Dennisport, MA (US); Andrew R. Lee, Hopkinton, MA (US); John J. Hart, III, Mashpee, MA (US); James A. Merkle, Jr., Rochester Hills, MI (US); Richard B. LeVine, Marstons Mills, MA (US)

(73) Assignee: SCA IPLA Holdings Inc., New York, NY (US)

( * ) Notice: Subject to any disclaimer, the term of this patent is extended or adjusted under 35 U.S.C. 154(b) by 1045 days.

(21) Appl. No.: 10/773,103

(22) Filed: Feb. 5, 2004
(Under 37 CFR 1.47)

(65) Prior Publication Data
US 2005/0108538 A1    May 19, 2005

Related U.S. Application Data

(63) Continuation-in-part of application No. 10/062,400, filed on Feb. 1, 2002.

(60) Provisional application No. 60/445,045, filed on Feb. 5, 2003.

(51) Int. Cl.
*H04L 9/32* (2006.01)
*G06F 11/30* (2006.01)
*G11B 5/00* (2006.01)
*G11B 19/04* (2006.01)

(52) U.S. Cl. .................... 713/176; 713/187; 369/275.3; 369/47.45

(58) Field of Classification Search ................. 713/176, 713/187; 369/275.3, 47.45
See application file for complete search history.

(56) References Cited

U.S. PATENT DOCUMENTS 4,168,396 A    9/1979 Best 4,176,247 A    11/1979 Englund
(Continued)

FOREIGN PATENT DOCUMENTS
DE        196 02 804 A1    7/1997
(Continued)

OTHER PUBLICATIONS

"Optical Data Copy Protection" Specification and Drawings of U.S. Appl. No. 09/608,886, filed Jun. 30, 2000, the prosecution history of which is available online at www.uspto.gov.
(Continued)

*Primary Examiner*—William R Korzuch
*Assistant Examiner*—Trang Doan
(74) *Attorney, Agent, or Firm*—Oblon, Spivak, McClelland, Maier & Neustadt, L.L.P.

(57) ABSTRACT

A method and system for authenticating a digital optical medium, such as a CD-ROM, determine whether the medium is an unauthorized copy, or the original. The original media is created, or altered, so as to contain anomalous locations from which the transfer of data is accomplished at different rates than a standard digital copy would exhibit. One implementation of the process involves timing analysis of the differences in data transfer rates. Another implementation involves the determination of digital signatures during multiple read operations performed on a data segment. The process can be employed in systems that control access to unauthorized copies, or may be used for other informative purposes. Theft, distribution, and piracy of digital content on optical media, such as computer software (also games, video, audio, e-book content), is often accomplished by copying it directly to another disc using commonly available copy tools and recordable optical media, or the replication of media to another mass manufactured disc. The present invention, which helps to irrefutably identify a unit of optical media as the original, and can correspondingly identify any copy made by any currently available means as such a copy, may prevent an unauthorized individual from making use of any unauthorized copies. This offers significant advantages to content creators who wish to protect their products.

12 Claims, 9 Drawing Sheets

U.S. PATENT DOCUMENTS

| | | |
|---|---|---|
| 4,223,050 A | 9/1980 | Nyfeler et al. |
| 4,246,638 A | 1/1981 | Thomas |
| 4,263,634 A | 4/1981 | Chenoweth et al. |
| 4,279,852 A | 7/1981 | Engelmann |
| 4,333,113 A | 6/1982 | Kalinowski |
| 4,335,173 A | 6/1982 | Caraballo |
| 4,336,981 A | 6/1982 | Mori |
| 4,433,207 A | 2/1984 | Best |
| 4,446,519 A | 5/1984 | Thomas |
| 4,453,074 A | 6/1984 | Weinstein |
| 4,454,594 A | 6/1984 | Heffron et al. |
| 4,458,315 A | 7/1984 | Uchenick |
| 4,462,076 A | 7/1984 | Smith, III |
| 4,465,901 A | 8/1984 | Best |
| 4,471,163 A | 9/1984 | Donald et al. |
| 4,479,579 A | 10/1984 | Miklos |
| 4,495,526 A | 1/1985 | Baranoff-Rossine |
| 4,510,508 A | 4/1985 | Janssen |
| 4,513,174 A | 4/1985 | Herman |
| 4,528,588 A | 7/1985 | Lofberg |
| 4,558,176 A | 12/1985 | Arnold et al. |
| 4,573,119 A | 2/1986 | Westheimer et al. |
| 4,577,289 A | 3/1986 | Comerford et al. |
| 4,584,641 A | 4/1986 | Guglielmino |
| 4,590,470 A | 5/1986 | Koenig |
| 4,593,353 A | 6/1986 | Pickholtz |
| 4,595,950 A | 6/1986 | Lofberg |
| 4,634,807 A | 1/1987 | Chorley et al. |
| 4,644,493 A | 2/1987 | Chandra et al. |
| 4,649,233 A | 3/1987 | Bass et al. |
| 4,652,990 A | 3/1987 | Pailen et al. |
| 4,658,093 A | 4/1987 | Hellman |
| 4,670,857 A | 6/1987 | Rackman |
| 4,677,604 A | 6/1987 | Selby, III et al. |
| 4,683,553 A | 7/1987 | Mollier |
| 4,683,968 A | 8/1987 | Appelbaum et al. |
| 4,685,055 A | 8/1987 | Thomas |
| 4,695,993 A | 9/1987 | Takagi et al. |
| 4,698,695 A | 10/1987 | Kosaka et al. |
| 4,724,492 A | 2/1988 | Kosaka et al. |
| 4,734,796 A | 3/1988 | Grynberg et al. |
| 4,740,890 A | 4/1988 | William |
| 4,742,543 A | 5/1988 | Frederiksen |
| 4,747,139 A | 5/1988 | Taaffe |
| 4,752,554 A | 6/1988 | Sato et al. |
| 4,757,468 A | 7/1988 | Domenik et al. |
| 4,757,534 A | 7/1988 | Matyas et al. |
| 4,761,775 A | 8/1988 | Murakami |
| 4,785,361 A | 11/1988 | Brotby |
| 4,796,181 A | 1/1989 | Wiedemer |
| 4,796,220 A | 1/1989 | Wolfe |
| 4,800,548 A | 1/1989 | Kioshi et al. |
| 4,839,883 A | 6/1989 | Nagata et al. |
| 4,849,836 A | 7/1989 | Kachikian |
| 4,849,927 A | 7/1989 | Vos |
| 4,858,036 A | 8/1989 | Ginkel |
| 4,866,769 A | 9/1989 | Karp |
| 4,868,805 A | 9/1989 | Hanami et al. |
| 4,879,704 A | 11/1989 | Takagi et al. |
| 4,891,504 A | 1/1990 | Gupta |
| 4,893,883 A | 1/1990 | Satzler |
| 4,903,296 A | 2/1990 | Chandra et al. |
| 4,907,216 A | 3/1990 | Rijnsburger |
| 4,910,725 A | 3/1990 | Drexler et al. |
| 4,942,565 A | 7/1990 | Lagadec |
| 4,949,331 A | 8/1990 | Maeda et al. |
| 4,959,861 A | 9/1990 | Howlette |
| 4,961,182 A | 10/1990 | Saito et al. |
| 4,967,403 A | 10/1990 | Ogawa et al. |
| 4,975,898 A | 12/1990 | Yoshida |
| 4,980,782 A | 12/1990 | Ginkel |
| 4,991,163 A | 2/1991 | Tokushuku et al. |
| 5,004,232 A | 4/1991 | Wong et al. |
| 5,027,396 A | 6/1991 | Platteter et al. |
| 5,060,219 A | 10/1991 | Lokhoff et al. |
| 5,065,429 A | 11/1991 | Lang |
| 5,073,925 A | 12/1991 | Nagata et al. |
| 5,122,912 A | 6/1992 | Kanota et al. |
| 5,150,339 A | 9/1992 | Ueda et al. |
| 5,153,861 A | 10/1992 | Maeda et al. |
| 5,155,768 A | 10/1992 | Matsuhara |
| 5,159,633 A | 10/1992 | Nakamura |
| 5,168,482 A | 12/1992 | Aratani et al. |
| 5,179,547 A | 1/1993 | Komaki et al. |
| 5,191,611 A | 3/1993 | Lang |
| 5,204,152 A | 4/1993 | Yoshizawa |
| 5,224,087 A | 6/1993 | Maeda et al. |
| 5,243,423 A | 9/1993 | DeJean et al. |
| 5,255,007 A | 10/1993 | Bakx |
| 5,267,311 A | 11/1993 | Bakhoum |
| 5,276,738 A | 1/1994 | Hirsch |
| 5,285,440 A | 2/1994 | Matsuda |
| 5,306,349 A | 4/1994 | Nee |
| 5,312,663 A | 5/1994 | Kosinski et al. |
| 5,323,367 A | 6/1994 | Tamura et al. |
| 5,350,923 A | 9/1994 | Bassignana et al. |
| 5,371,792 A | 12/1994 | Asai et al. |
| 5,379,433 A | 1/1995 | Yamagishi |
| 5,392,351 A | 2/1995 | Hasebe et al. |
| 5,400,319 A | 3/1995 | Fite et al. |
| 5,400,403 A | 3/1995 | Fahn et al. |
| 5,410,527 A | 4/1995 | Ashinuma |
| 5,412,718 A | 5/1995 | Narasimhalu et al. |
| 5,418,852 A | 5/1995 | Itami et al. |
| 5,424,102 A | 6/1995 | Mizukuki et al. |
| 5,430,281 A | 7/1995 | Lentz et al. |
| 5,430,284 A | 7/1995 | Numazaki |
| 5,457,668 A | 10/1995 | Hibino et al. |
| 5,457,746 A | 10/1995 | Dolphin |
| 5,463,604 A | 10/1995 | Naito |
| 5,473,584 A | 12/1995 | Oshima et al. |
| 5,475,664 A | 12/1995 | Shimizume et al. |
| 5,489,768 A | 2/1996 | Brownstein et al. |
| 5,513,169 A | 4/1996 | Fite et al. |
| 5,513,260 A | 4/1996 | Ryan |
| 5,538,773 A | 7/1996 | Kondo |
| 5,541,904 A | 7/1996 | Fite et al. |
| 5,552,098 A | 9/1996 | Kudo et al. |
| 5,563,947 A | 10/1996 | Kikinis |
| 5,569,522 A | 10/1996 | Steininger et al. |
| 5,570,339 A | 10/1996 | Nagano |
| 5,572,507 A | 11/1996 | Ozaki et al. |
| 5,579,113 A | 11/1996 | Papst et al. |
| 5,587,984 A | 12/1996 | Owa et al. |
| 5,590,111 A | 12/1996 | Kirino et al. |
| 5,596,639 A | 1/1997 | Kikinis |
| 5,661,703 A | 8/1997 | Moribe et al. |
| 5,696,757 A | 12/1997 | Ozaki et al. |
| 5,698,833 A | 12/1997 | Skinger |
| 5,703,858 A | 12/1997 | Mitchell et al. |
| 5,706,047 A | 1/1998 | Lentz et al. |
| 5,706,266 A | 1/1998 | Brownstein et al. |
| 5,708,649 A | 1/1998 | Kamoto et al. |
| 5,714,935 A | 2/1998 | Ryan, Jr. |
| 5,719,937 A | 2/1998 | Warren et al. |
| 5,724,327 A | 3/1998 | Timmermans et al. |
| 5,737,286 A | 4/1998 | Timmermans et al. |
| 5,754,649 A | 5/1998 | Ryan et al. |
| 5,761,301 A | 6/1998 | Oshima et al. |
| 5,770,348 A | 6/1998 | Kondo |
| 5,799,145 A | 8/1998 | Imai et al. |
| 5,805,551 A | 9/1998 | Oshima et al. |
| 5,807,640 A | 9/1998 | Ueno et al. |
| 5,809,006 A | 9/1998 | Davis et al. |

| | | | | | | |
|---|---|---|---|---|---|---|
| 5,812,501 | A | 9/1998 | Moribe et al. | 7,082,413 B2 * | 7/2006 | Bell et al. ............... 705/51 |
| 5,815,484 | A | 9/1998 | Smith et al. | 7,114,119 B1 * | 9/2006 | Morris ............... 714/766 |
| 5,818,812 | A | 10/1998 | Moribe et al. | 7,325,145 B1 * | 1/2008 | England ............... 713/187 |
| 5,822,291 | A | 10/1998 | Brindze et al. | 7,486,790 B1 * | 2/2009 | Selinfreund et al. ......... 380/201 |
| 5,826,156 | A | 10/1998 | Natsume et al. | 2001/0024411 A1 | 9/2001 | Pirot et al. |
| 5,875,156 | A | 2/1999 | Ito et al. | 2002/0001690 A1 | 1/2002 | Selinfreund et al. |
| 5,881,038 | A | 3/1999 | Oshima et al. | 2002/0013853 A1 * | 1/2002 | Baber et al. ............... 709/232 |
| 5,886,979 | A | 3/1999 | Moribe et al. | 2002/0048225 A1 | 4/2002 | Shinoda |
| 5,905,798 | A | 5/1999 | Nerlikar et al. | 2002/0069389 A1 * | 6/2002 | Sollish et al. ............... 714/758 |
| 5,930,209 | A | 7/1999 | Spitzenberger | 2002/0114265 A1 | 8/2002 | Hart, III et al. |
| 5,930,210 | A | 7/1999 | Timmermans et al. | 2002/0142248 A1 * | 10/2002 | Dubois et al. ......... 430/270.15 |
| 5,959,954 | A | 9/1999 | Yamamuro | 2002/0162075 A1 * | 10/2002 | Talagala et al. ............ 714/819 |
| 5,960,398 | A | 9/1999 | Fuchigami et al. | 2002/0181369 A1 | 12/2002 | Yeo |
| 5,963,909 | A | 10/1999 | Warren et al. | 2003/0046545 A1 | 3/2003 | Merkle, Jr. et al. |
| 5,982,886 | A * | 11/1999 | Itami et al. ............... 705/57 | 2003/0072447 A1 * | 4/2003 | Saliahov ............... 380/229 |
| 6,011,765 | A | 1/2000 | Nishio | 2003/0091108 A1 * | 5/2003 | Tanaka ............... 375/150 |
| 6,011,772 | A | 1/2000 | Rollhaus et al. | 2003/0147339 A1 | 8/2003 | Selinfreund et al. |
| 6,029,259 | A | 2/2000 | Sollish et al. | 2003/0219124 A1 | 11/2003 | Selinfreund et al. |
| 6,052,465 | A | 4/2000 | Gotoh et al. | 2004/0003316 A1 * | 1/2004 | Meng et al. ............... 714/13 |
| 6,101,476 | A | 8/2000 | Kamatakis et al. | 2004/0004922 A1 | 1/2004 | Selinfreund et al. |
| 6,104,679 | A | 8/2000 | Sollish ............... 369/33 | 2004/0019764 A1 * | 1/2004 | Steiss et al. ............... 711/216 |
| 6,108,296 | A | 8/2000 | Kajiyama et al. | 2004/0152017 A1 | 8/2004 | Vig et al. |
| 6,122,373 | A * | 9/2000 | Gotoh et al. ............... 705/52 | 2005/0050343 A1 * | 3/2005 | Selinfreund et al. ......... 713/193 |
| 6,122,739 | A | 9/2000 | Kutaragi et al. | 2005/0063256 A1 | 3/2005 | Selinfreund et al. |
| 6,144,745 | A * | 11/2000 | Akiyama et al. ............ 380/232 | 2005/0083829 A1 | 4/2005 | Selinfreund et al. |
| 6,167,136 | A | 12/2000 | Chou | 2005/0084645 A1 | 4/2005 | Selinfreund et al. |
| 6,204,981 | B1 | 3/2001 | Ogino et al. | 2005/0153109 A1 | 7/2005 | Drew et al. |
| 6,226,244 | B1 | 5/2001 | Timmermans et al. | 2006/0023600 A1 | 2/2006 | Selinfreund et al. |
| 6,262,967 | B1 | 7/2001 | Kajiyama et al. | 2006/0259975 A1 * | 11/2006 | Cohen ............... 726/26 |
| 6,285,764 | B1 | 9/2001 | Gotoh et al. | | | |
| 6,298,138 | B1 | 10/2001 | Gotoh et al. | | | |

FOREIGN PATENT DOCUMENTS

| | | |
|---|---|---|
| DE | 19602804 | 7/1997 |
| DE | 198 42 392 | 9/1998 |
| EP | 0 731 454 | 9/1996 |
| EP | 0 987 705 | 9/1999 |
| JP | 08096508 | 4/1996 |
| WO | WO96/21928 | 7/1996 |
| WO | WO 98/08180 | 2/1998 |
| WO | WO 98/41979 | 9/1998 |
| WO | WO99/67085 | 12/1999 |
| WO | WO 02/02301 A1 | 1/2002 |
| WO | WO 02/03106 A2 | 1/2002 |
| WO | WO 02/03386 A2 | 1/2002 |
| WO | WO 02/082429 | 10/2002 |
| WO | WO 03/017202 | 2/2003 |

| | | | |
|---|---|---|---|
| 6,304,971 | B1 | 10/2001 | Kutaragi et al. |
| 6,311,305 | B1 | 10/2001 | Sollish et al. ............... 714/784 |
| 6,338,933 | B1 | 1/2002 | Lawandy et al. |
| 6,366,969 | B1 * | 4/2002 | Hanson ............... 710/52 |
| 6,425,098 | B1 | 7/2002 | Sinquin et al. |
| 6,452,885 | B1 | 9/2002 | Yeo |
| 6,477,124 | B2 * | 11/2002 | Carson ............... 369/53.21 |
| 6,532,201 | B1 | 3/2003 | Hogan |
| 6,553,511 | B1 * | 4/2003 | DeKoning et al. ............ 714/6 |
| 6,589,626 | B2 | 7/2003 | Selinfreund et al. |
| 6,631,108 | B1 | 10/2003 | Hogan |
| 6,638,593 | B2 | 10/2003 | Selinfreund et al. |
| 6,641,886 | B1 | 11/2003 | Bakos et al. |
| 6,654,331 | B1 | 11/2003 | Wilson et al. |
| 6,694,451 | B2 * | 2/2004 | Atkinson ............... 714/15 |
| 6,711,106 | B2 * | 3/2004 | Sasaki ............... 369/47.28 |
| 6,718,501 | B1 | 4/2004 | Brody et al. ............... 714/752 |
| 6,733,950 | B2 | 5/2004 | Breitung et al. |
| 6,747,930 | B1 * | 6/2004 | Weldon et al. ............ 369/53.21 |
| 6,767,695 | B2 * | 7/2004 | Kelley et al. ............... 430/320 |
| 6,775,227 | B2 * | 8/2004 | Watanabe et al. ......... 369/275.3 |
| 6,826,137 | B1 | 11/2004 | Lee et al. |
| 6,838,145 | B2 | 1/2005 | Drew et al. |
| 6,952,392 | B2 | 10/2005 | Vig et al. |
| 6,958,960 | B2 * | 10/2005 | Sasaki ............... 369/47.28 |

OTHER PUBLICATIONS

"Method and Apparatus of Controlling Access to Storage Media" Specification and Drawings of U.S. Appl. No. 09/631,505, filed Aug. 3, 2000, the prosecution history of which is available online at www.uspto.gov.

"Method for Determining Compact Disk-Disk-Read Only Memory Quality During Verify," IBM Technical Disclosure Bulletin, Feb. 1997, pp. 217-218.

* cited by examiner

SYSTEMS AND METHODS FOR MEDIA AUTHENTICATION

RELATED APPLICATIONS

This application is a continuation-in-part application of U.S. Ser. No. 10/062,400, filed Feb. 1, 2002, the contents of which are incorporated herein by reference, in their entirety.

This application claims the benefit of U.S. Provisional Application 60/445,045, filed Feb. 5, 2003, the contents of which are incorporated herein by reference, in their entirety.

BACKGROUND OF THE INVENTION

1. Field of the Invention

This invention is related to the field of systems and methods for preventing, deterring and detecting the unauthorized duplication of digital information, such as digital information distributed on optical media. The method relies upon a computing device executing validation code, either stored on the media itself or stored in firmware, volatile device memory provided from an external store or network transaction, or non-volatile device memory within the device, prior to allowing full access to the protected content.

2. Description of the Related Art

The electronic publishing industry, which publishes application software, computer games, appliance-console games, movies, and music on optical media is facing a growing and serious problem; namely, the piracy, unauthorized modification, and use of digital content. Since digital content itself is in essence a sequence of binary 1's and 0's, it may often be copied exactly, wherein a copy of these "bits" is identical in every way to the original, and since the tools that enable such copying are becoming more readily available, the industry is facing ever-increasing losses. Such losses may include the unauthorized duplication of a unit of optical media containing a game, a word processing program, an E-Book, a movie, or musical content.

A number of mechanisms are currently available that may be used to limit or prevent unauthorized access to digital content, including those approaches related to optical media manufacturing, modification, and protection thereof.

The most popular among these methods include methods that insert data errors into the media at the time of manufacture by producing actual bit patterns that are technically out of conformance with published standards and specifications (originally such as those set by Philips Corporation in their CD specification documents sometimes referred to as the "Red Book", "Orange Book", and other industry-standards-book names). In theory, the errors cannot be reproduced by copying processes or devices if those devices or processes are themselves specification conformant. However, such approaches are limited in that they do not take into account that while these bit patterns are not officially sanctioned and not specification conformant, the approach relies on unenforceable voluntary specification compliance. Even as recently as a few years ago, most device manufacturers were in fact working very hard to be specification conformant, and most copy software was also conformant, so these protective methods were effective for a period of time. However, it was realized that by making minor changes to the devices and software, they could be made to copy nearly everything, even protected titles. This resulted in sales of more devices, more copying software, and, of course, more blank media, and such devices are not in any way illegal. Certain usage is, but that is the responsibility of the purchaser. A slippery slope of sorts, but piracy is ubiquitous and part of the reason why many segments of industry and society derive financial benefit from the act of piracy. Devices have intentionally been created which ignore these specification deviations, as have software programs dedicated to copying media such as the popular "BlindRead" and "CloneCD" software products. Examples of devices that deviate from the specifications are for example CD-R and CD-RW drives manufactured under the name "Lite-On" or "Liteon", or devices made by industry giant "Plextor", which are engineered to copy and reproduce all bits on a disc exactly, regardless of specification conformance. Since the methods mentioned above rely on conformance to specifications and on industry consortia applying pressure to manufacturers and software companies to cause them to comply with the specifications, they are inherently flawed, because any number of such companies can, and have, carved themselves a perfectly legal market niche by breaking ranks, doing just the opposite and creating devices optimized for such unauthorized duplication usage. If copying of a medium is physically possible, then it will be copied and distributed. This is the significant challenge faced in this field; to create media authentication mechanisms that depend on detection of repeatable, measurable media properties, and which do not depend on voluntary specification compliance across a broad set of industries.

Conventional implementations of some significance include methods that depend on the existence of media errors and the detection of these errors in order to authenticate the media. These historic methods relied, as described above, upon cooperation and compliance from the makers of copying software and makers of the drives themselves. The intentionally-generated errors used by these approaches were sometimes chosen to be illegal and/or outside the appropriate specification, and the cooperating parties were encouraged to ship only those products that would ignore, or fail to fully, or correctly, copy the bit patterns. Since any and all bit patterns are inherently copyable, it was only a matter of time before one or more of these cooperating parties broke ranks and created copy software (Blind Read, Clone CD for example) and media drives (Plextor, Lite-On) that could generate an exact copy of these "uncopyable errors", invalidating the entire class of protection technologies based on this approach. The very failing of these methods lies in that the property they detected and depended upon can be wholly, or sufficiently copied by digital means. Such prior art "Backup-Resistant" or "Copy Protected" digital media that relies upon validation code executing on a general purpose device, is able to be wholly copied if all available bits of data relied upon by the validation algorithm can be accurately duplicated at a fundamentally low enough level onto recordable media and subsequently read on legacy devices.

A class of these authentication methods are restricted to protecting optical media intended to be used in general purpose computing devices. Such media includes a wide variety of formats such as CD-ROM, CDR, CDI, CDRW, DVD-ROM, DVD-RAM, DVD+, DVDR, CD+ (also called CDPlus or Enhanced CD, or Blue Book). Other such authentication methods can protect content on Audio and Video CD's and DVD's by applying the above methods to algorithmic logic resident in firmware or non-volatile memory within the playback device, itself a computing device whose usage is much like an appliance.

Despite such developments, no current validation methods succeed at preventing accurate duplication of such protected media and the data on the media, either intended for use on general purpose computers, such as mass-produced "stamped" optical digital formats including CD-ROM, CDR, CDI, DVD-ROM, and CD+, or on appliance devices, consumer players, and game consoles.

SUMMARY OF THE INVENTION

The present invention provides a system and method for authentication that overcomes the limitations of the conventional approaches. The system and method of the present invention can be utilized on current media formats, as well as future optical formats beyond those mentioned above, and on both media destined for general purpose computing devices (such as personal computers) and appliance computing devices (including but not limited to game console devices, DVD and CD players).

The present invention is directed to an authentication method that detects whether digital information stored on rotating optical media is the original version or a duplicate copy by timing analysis of specific data transfers. Timing measurement and quantification may employ accessing the media at a specific rotation rate if possible, or permitted, on the optical media compatible device. Following the authentication process based on the data transfer rate the system may respond by preventing unrestricted usage, by allowing such usage in whole or in part, or may be merely informative.

The present invention relies upon the detection of especially problematic locations, or anomaly regions, on the original media that a reading device would encounter minor difficulty in reading. The anomaly regions do not necessarily resulting an absolute failure by the device to read the media, or do not necessarily generate any recoverable, or unrecoverable device errors. Rather, the device reacts by attempting to re-read read the information by rotating the media past the read head additional times, or perhaps not attempting to re-read, but rather slowing down the rotation rate of the device, or both. Many contemporary optical media devices do this automatically, at a very low level, even when error correction and error handling is disabled by means of device firmware commands.

Such anomaly regions can be introduced in a diverse number of ways on the top, bottom, or both, surfaces of the media, by any of a number of methods. The anomaly regions may be positioned directly under the read head. Alternatively, they may be positioned such that incidental effects of adjacent track areas interfering with the current track due to refraction effects, polarization effects, or other optical anomalies, may be employed. The anomaly regions may be present during initial creation of the media, or alternatively may be added following replication. A number of techniques for introducing such anomaly regions have been demonstrated. Duplicated media currently utilizes discrete bits and rigidly defined waveforms in data storage representations. Copying devices and associated software cannot adequately replicate such marginally readable anomaly regions.

The invention embodies estimating the anticipated transfer rate with precision and comparing the expected data transfer rate with the measured data transfer rate. Subtle data transfer rates and associated rate changes are detected over time, for example by a general purpose computing device. Such computing devices usually containing a wide variety of reading devices from various manufacturers.

The present invention is intended to prevent, deter and/or detect the existence of unauthorized duplicates of digital information of all types, for example, such digital information as having been originally distributed on optical media of all types.

The devices referred to as read or read/write devices in this context include Compact Disc (CD, CD-R, CD-RW), DVD (all types including DVD-R and DVD-RW), other multi-layer and/or multi-sided media, or any other optical media devices and media as used on such systems. The media referred to may comprise CD, CD-R, CD-RW, DVD and all other variants of disc-shaped single-sided and double-sided media. The present invention is equally applicable to other media types, for example, card-shaped media, other shapes of media, flat or otherwise, in any appropriate reading device for that media, attached to any form of computing device. For example a keycard badge and keycard badge reader would fall under the definition of media (card), drive (reader), and computing system (device the reader is connected to which determines authenticity). This method applies equally well to other forms of data storage media, such as magnetic hard disc drives.

In particular the present invention is related to systems and methods that detect duplicates of original optical media and/or subsequent use of such unauthorized duplicate copies via optical media devices such as those as found on computer systems and consumer-appliance systems. This process of detection is one that can discriminate between duplicates of the original media made by digital duplication processes and the original media itself.

The present invention provides mechanisms that yield measurement capabilities that can distinguish an original media from a copy of the media by means of measuring and quantifying into a reliable media signature the direct and indirect aspects of the performance of the media in the optical drive reading the media, in order to detect media-specific performance anomaly locations. Performance anomaly values may include such data as anomalous rotational speed variations, data rate, and the frequency and type of reported device status messages throughout the process of reading the optical media. Direct measurements may include any form of information that the optical media drive is capable of providing; this varies depending on how the optical media drive is instrumented and depending on what commands are recognized by on-board firmware. Such direct measurements include information about the drive's on-board cache buffer status, the actual rotational speed of the disc within the drive, device status, the device's intended rotational speed, and direct access to data being read without physical caching. Indirect measurements are performed outside the optical media drive, at the system and device driver level, and may include such items of information as the rotational speed of the drive (for example calculated inferentially based on cache performance if direct access to the cache is disallowed), cache status (for example calculated inferentially based on cache performance if direct access to the cache is disallowed), and reported device status. Indirect measurement capabilities such as these may require the services of additional invention mechanisms that filter out other system activities and effects in order to more accurately infer the actual performance and status of the device. For reliability, these event filtration mechanisms are used throughout the system to clarify analysis of the optical media instance performance. This anomaly signature can take the form of a single anomaly, or alternatively a collection of multiple anomaly locations. Data may be encoded by expressing values based on the relationships between the locations and on the degree of the effect on performance a given anomaly has at each location.

The media as successfully identified and read according to the systems and methods of the present invention may include measurable or perceptible areas of performance variation. In one example, the reading optical drive may at times only be capable of delivering a fractional amount of its expected I/O data transfer performance. This fractional performance variation, whether as exhibited in a single instance, or over time, forms the basis of a unique per-unit-of-optical-media performance signature. The inverse may also be deliberately employed, such as common media areas being slower, and detection areas being faster to access. The ability to detect this, and to discriminate and filter actual performance metrics from unrelated system events is challenging. These anomaly locations may be present on the media as a result of the manufacture process (such as non-standard deviations formed during manufacture, or anomaly locations intentionally integrated into the manufacturing process), or, alternatively, the media may be physically modified following the manufacturing process. These anomaly locations may also be present unintentionally or forensically as a result of the "handling history" of a unit of optical media (for example being scratched due to rough handling). These anomaly locations may need not be areas of unreadable, incorrect or damaged data, and may be introduced in many different manners including but not limited to rotationally unbalanced media, optical path interference, or other physical phenomenon that affect readability. The systems and methods of the present invention are concerned with the detection of any and all such media signatures regardless of how they came to be on the media.

In this manner, the present invention does not depend upon the incorporation of unreadable media error block locations or other unrecoverable device and media errors as utilized by many of the conventional methods described above. Nor does the present invention depend upon the detection of media anomalies that are deliberate non-standard bit or wave patterns that are interpreted by the device at higher levels (tokenized) differentially. The present invention further does not depend on the existence or absence of the non-standard tokenized bit patterns that legacy optical media recorders have difficulty in recording.

Data transfer rates can be tracked over time across a range of addressable blocks. The authentication signature as media performance varies over time may be visualized as a series of curves, of valleys in an otherwise ascending (as the drive spins up) or flattening (when the drive is operating at maximum drive speed) slope. By contrast with such performance anomaly locations, unrecoverable error locations such as those used in historic prior art methods represent sustained periods of zero bytes per time unit performance, and exhibit a substantially vertical slope. This indicates an utter failure to read for a measurable period of time, which may be visualized as a flat line at zero. Any such areas of zero bytes per time unit performance caused by any event of any kind are not considered to represent a valid signature. According to the present invention, valid anomaly signatures do not exhibit unrecoverable reported errors during validation, as do the conventional approaches. Note that in such conventional approaches wherein fabricated media errors disallow the reading of any data from that location, it is easily possible to duplicate all such bit patterns today using available optical media copy utilities, and such ease of replication can compromise the effectiveness of authentication procedures.

In a first aspect, the present invention is directed to a method for authenticating digital media. Transfer rate of read data resulting from the reading of valid data stored on a digital medium at a physical location is monitored. The presence of an anomaly region on the digital medium corresponding to the physical location of the valid data on the digital medium is determined from the monitored transfer rate. A determination is made as to whether the digital media is authentic based on a characteristic of the anomaly region.

The digital medium may comprise various forms of readable media, for example optical and magnetic digital media. The transfer rate may be monitored in real time, as the read data is read from the digital medium, and/or following reading of the read data from the digital medium. The monitored data transfer rate may be estimated, and the presence of the anomaly region may be based on the estimated data transfer rate.

The anomaly region preferably causes a modification in the transfer rate of the read data. The modification results from multiple read operations of the data in the anomaly region.

The anomaly region may be located at a predetermined location on the medium, in which case, the characteristic is the position of the anomaly region in the read data. If the position of the anomaly region in the read data matches the predetermined position of the anomaly region, then the digital medium is determined as authentic. If the position of the anomaly region in the read data does not match the predetermined position of the anomaly region, then the digital medium is determined as non-authentic. User access to the digital medium may be permitted or forbidden, or some variation thereof, based on whether the medium is authentic.

The anomaly region in the read data may result from a difficulty in the reading of the read data by a reading device. The difficulty may arise from a modification that affects the readability of data on the medium, for example a mechanical, or optical, modification.

The steps for performing the authentication may reside in software code that is previously stored on the digital medium, prior to authentication. A known characteristic of the anomaly region may be previously stored on the digital medium, prior to authentication, in which case the determination as to whether the digital medium is authentic based on a characteristic of the anomaly region comprises comparing the characteristic to the known characteristic.

An anomaly region in the read data can be identified according to a modification in the transfer rate of the read data. The modification in the transfer rate may comprises a reduction in the transfer rate, in which case the anomaly region is identified based on the extent of the reduction. The modification in the transfer rate may comprise a reduction in the transfer rate, for example a gradual reduction, in which case, gradual reduction of the data rate results in the anomaly region being determined as a genuine anomaly region. The modification in the transfer rate may comprise a reduction in the transfer rate, for example a sudden reduction, in which case the sudden reduction of the data rate results in the anomaly region being determined as a false anomaly region, which may indicate that the medium is non-authentic. Alternatively, the modification in the transfer rate may comprise an increase in the transfer rate, and the characteristic is determined based on the increase.

In another alternative, the modification in the transfer rate may comprise a response comprising a gradual reduction in the data transfer rate followed by a sudden increase in the transfer rate to an increased transfer rate that is greater than a maximum transfer rate, in which case the response indicates that an apparent anomaly region generated by an external source has been detected. The apparent anomaly region may be identified and filtered such that the step of determining whether the digital medium is authentic based on a characteristic of the anomaly region is not based on the apparent anomaly region.

The determination as to whether the digital medium is authentic is based on a characteristic of multiple anomaly regions, or, alternatively, on multiple characteristics of the same, or multiple, anomaly region(s).

In another aspect, the present invention is directed to a method for determining the presence of an anomaly region in a digital medium. Multiple read operations are performed on a data segment of the medium to generate multiple corresponding read data results. Corresponding digital signatures are calculated for each of the multiple read data results. A determination is made as to the presence of an anomaly region in the data segment based on a comparison of the digital signatures.

The data comprises, for example, data selected from the group consisting of: user data, error data, sync data, parity data, header data, and sub-channel data.

The present invention may further comprise monitoring a transfer rate of the read data during at least one of the read procedures, and further determining whether an anomaly region is present in the data segment based on the monitored transfer rate.

The present invention may further comprise monitoring a first transfer rate of first read data during one of the read procedures, and determining whether an anomaly region is present in the data segment based on the monitored first transfer rate; and in the event that the presence of an anomaly is not determined as a result of the first monitoring, second monitoring a second transfer rate of second read data during another of the read procedures, and further determining whether an anomaly region is present in the data segment based on the monitored second transfer rate.

The digital signature that is calculated may comprise, for example, MD2, MD4, MD5, Snefru, SHA, NIST DSA, Haval, N-Hash, or RIPE-MD digital signatures.

The determination as to whether an anomaly region is present in the data segment of the medium based on a comparison of the digital signatures may comprise determining whether the any of the digital signatures are equal in value. In one embodiment, if none of the digital signatures are equal in value, the anomaly region is determined to be present. In an alternative embodiment, if a predetermined number of the digital signatures are not equal in value, the anomaly region is determined to be present.

The medium may then be authenticated in response to the determination of the presence of the anomaly region.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention

DETAILED DESCRIPTION OF PREFERRED EMBODIMENTS

Figure 1:
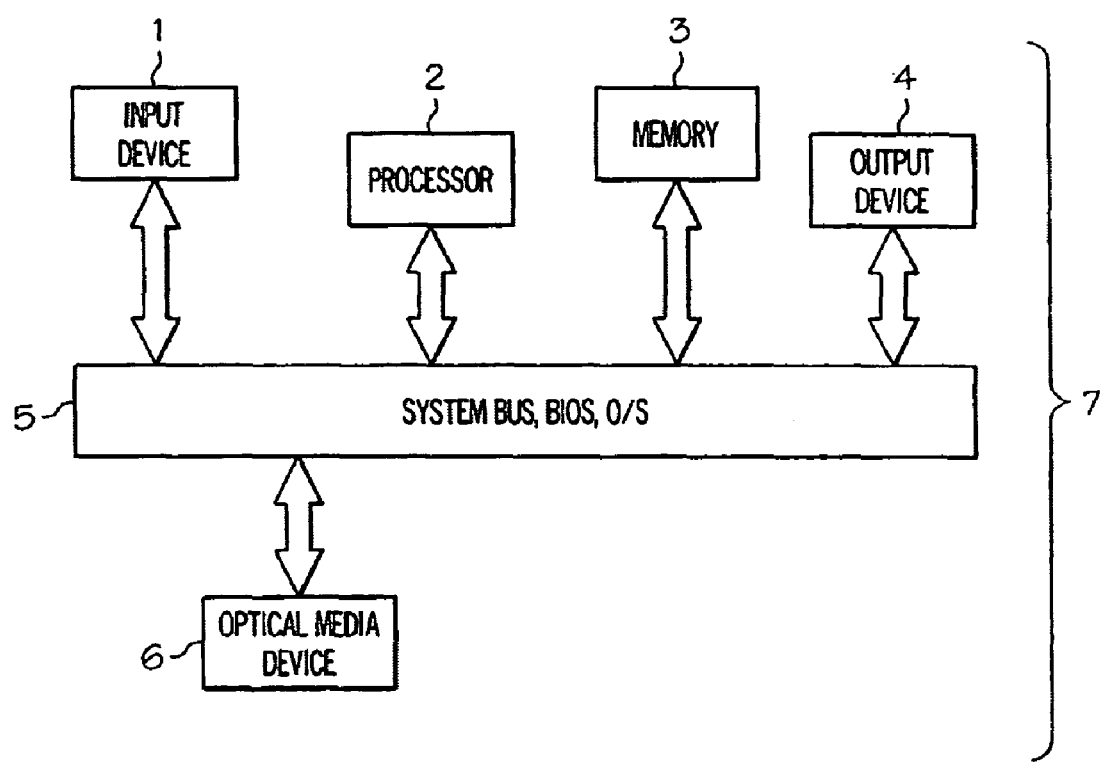
FIG. 1 is a block diagram of a computer system or consumer computerized appliance device including an optical media device, in accordance with the present invention.

The systems and methods of the present invention and various embodiments thereof may be implemented on any of a number of media reading device platforms, including, for example, a personal computer or general purpose digital computer 7 as shown in FIG. 1, including, but not limited to, single- or multiple-processor-based Windows™, Linux™ or Macintosh™ desktop computers such as those found with increasing frequency in contemporary homes and offices. Embodiments of the invention may optionally be implemented on firmware or a digital processing circuit, including, but not limited to, those found in CD and DVD consumer audio/video appliance components or systems, game consoles with optical media devices or optical media device support, in stationary and mobile applications. Embodiments of the invention may alternatively be deployed on other computing appliance devices such as hard-disk or random access memory based video and audio entertainment appliances which contain drives capable of reading from and/or writing to optical or magnetic-based media, which may be digital-processing-circuit based, or may be based on general-purpose digital computing architectures. In all such cases, a digital medium, for example an optical medium. is at some point resident within, or inserted into, the optical media drive 6 and read, the data flowing through the system bus 5, into memory 3, such data being manipulated by the processor 2 and an eventual result being presented to a user by means of an output device or devices 4.

The various forms of media to which the systems and method of the present invention are applicable include those in which the media is comprised of a data-bearing surface attached to, or housed within, a reading device, one or both of which is moving with respect to the other. In one popular class of such devices the media rotates and the reading device addresses one or both sides of the media surface by moving a reading head with respect to the rotating data-bearing surface.

For example, an optical media disc such as a Compact Disc has data arranged in a spiral pattern and the data is read from the center outwards to the perimeter. The disc rotates and the reading head follows the spiral track of increasing radius by moving the reading device outwardly from the rotational center of the disc. When the data is more difficult to read, for example obscured by a physical deformation of the disc, the reading device may slow its rotational speed and/or re-read portions of the data. The operation of re-reading may occur by keeping the reading head in a fixed location and not moving it in a direction away from the center of the disk as the disc rotates, causing it to re-read portions of the spiral or arc of data. In many cases the reading device will have such retry logic implemented at a very low level and may silently retry and/or slow down the reading operation without issuing any error.

Such slowdown of the media reading operation may be initiated in cases where the media contains instances of anomalies that result in a modification of reading performance. These anomaly locations, or regions, may be present on the media as a result of the manufacture process (such as non-standard media surface, or subsurface, deviations formed during manufacture, or anomaly locations intentionally integrated into the manufacturing process), or, alternatively, the media may be physically modified following the manufacturing process. These anomaly locations may also be present unintentionally or forensically as a result of the "handling history" of a unit of optical media (for example being scratched due to rough handling). These anomaly locations need not necessarily comprise instances of entirely unreadable, incorrect or damaged data, but can instead modify the read performance of the reading device. The anomaly locations may be introduced on the media in many different ways, including, but not limited to, rotationally unbalanced media, optical path interference, or other physical phenomenon that affect readability. Such anomalies may take the form of non-standard physical surface media topology, or optical qualities of materials selected for the physical location corresponding to a data location on that media. Even something as simple as a single or multiple scratches or dents, on either, or both, surfaces of the media may be used to create the anomaly region. The systems and methods of the present invention are concerned with the detection of any and all such media anomaly signatures regardless of their source.

Devices that read rotating data storage media such as optical media usually attempt to read the data on the media as quickly as possible, with error correction and retries enabled, unless a command is issued to the device requesting otherwise. Many such devices perform read operations with great tenacity, and in the event of any difficulty in reading, they will attempt to re-read the data one or more times before reporting an error, and, consequently, will slow the drive's rotational speed as necessary. This re-read of the data usually takes place automatically, and is initiated by the drive. Many such drives perform the retry and re-read operations even when given direct commands to disable error correction and retries. Virtually all drives will treat a successful re-read as a successful read and fail to report any error, even if their status is closely monitored.

Rather than requiring a detection of an outright error during the reading process, or an outright failure of the reading process, the systems and methods of the present instead analyze the drive's reading performance at times when the reading process does not fail or generate any errors, and from that performance divine the properties of the media being read.

Figure 2:
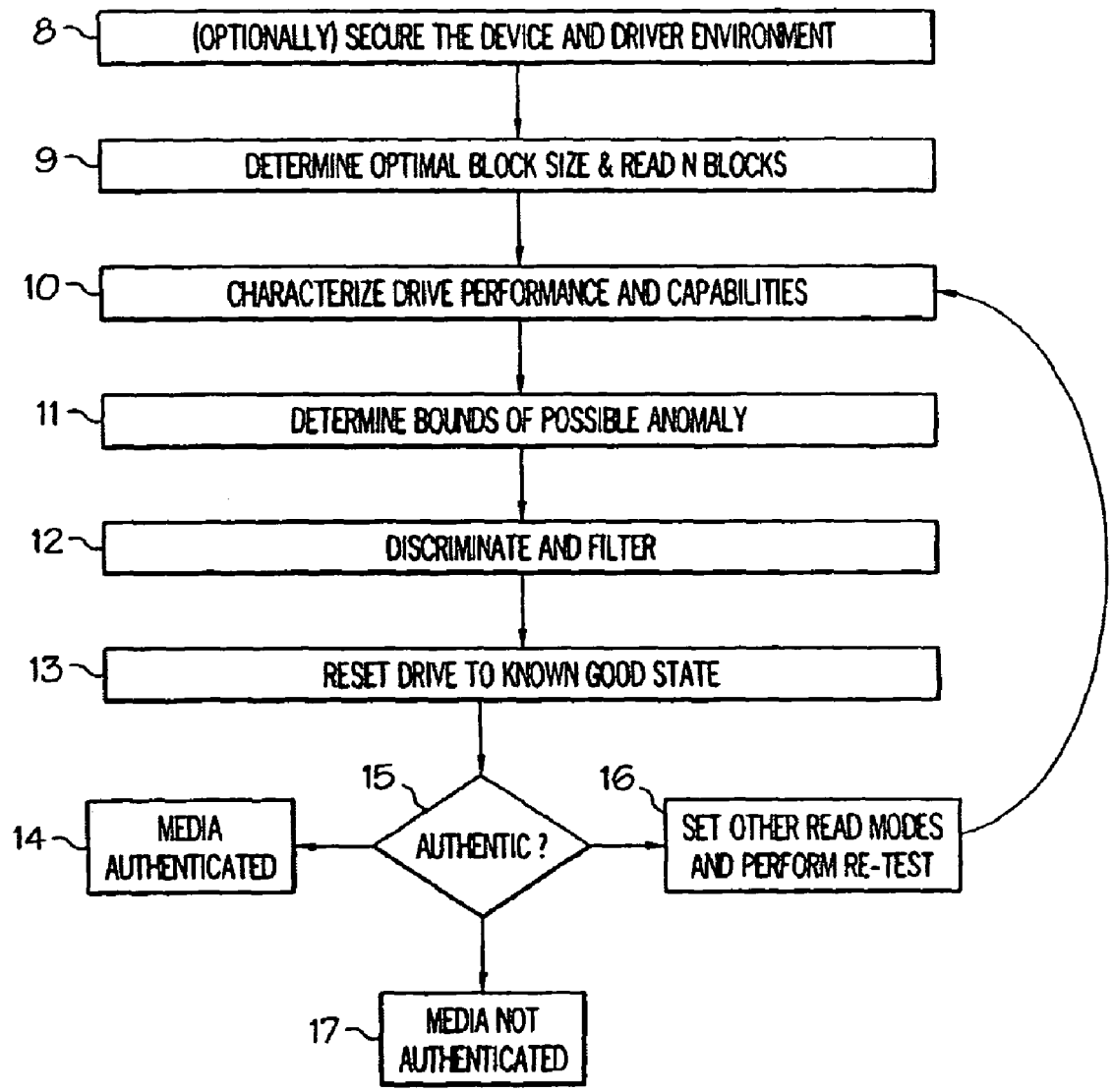
FIG. 2 is a logical flow diagram illustrating the core detection process according to the present invention.

As shown in the flow diagram of FIG. 2, the system embodying the present invention accesses the optical media device directly 8 and exercises device control functions (see description of FIG. 8 for more detail on this topic) in order to ensure that the device is authentic, and sets appropriate device settings such as desired read speed. Optimal block size is determined 9, for example by cycling the drive through all the supported block sizes as determined in step 8 above and by measuring performance at each cycle. The block size with the desired performance is chosen 9 and bytes are read from the media according to the selected block size. During the initial reading of data, the performance of the drive and the performance of the media are quantified and recorded in a historic archive. In one example, the performance of each read of a sequence of reads or a sample across a large number of reads at a selected interval may be recorded and used for later analysis.

After a predetermined amount of data has been read, the detection mechanism of the present invention begins to attempt to screen the read data in order to detect the bounds of an anomaly 11. Detection criteria for an example anomaly are described below in FIG. 3 in detail. When the boundary of a possible anomaly is determined 11 it can be acted upon immediately or recorded and acted upon at a later time. The process of the present invention accommodates both cases wherein the anomaly determination in made in real time, the case where historic read data is logged and make an overall determination is made regarding multiple potential anomaly characteristics as a post-processing discrimination step 12.

At any point in time, the drive may be placed into an unusual state by the detection process of the present invention, and it may require reset to a known good state 13; the device commands to do so sometimes work, in some drives, but often multiple commands must be issued, for example in the case of very inexpensive drives, the drive can be reset most effectively by opening and closing the drive door, or by effectively remounting, or resetting, the media logically without opening the drive door. The process of the present invention can optionally make a determination as to whether the drive needs to be reset based on the performance and operational behavior exhibited. The process of discriminating and filtering actual anomaly locations from false ones (as discussed in detail below with reference to FIG. 6) results in a decision 15 occurring as to whether the data indicates that media authentication 14 has occurred, whether the media 17 is invalid or unauthorized, or whether the system intends to continue to gather data before making an authentication determination 16.

Figure 3:
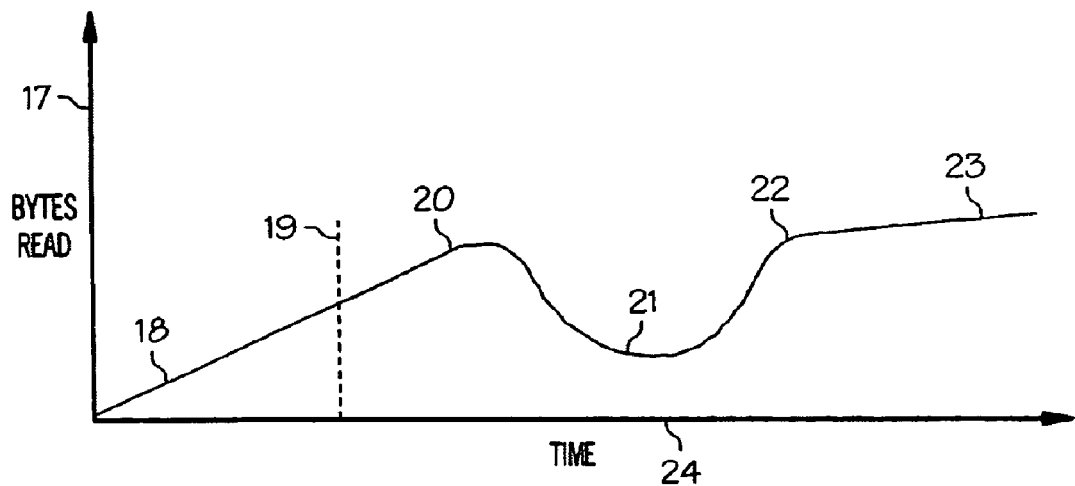
FIG. 3 is a performance history diagram illustrating an example of a performance anomaly, in accordance with the present invention.

As illustrated in FIG. 3 an instructive way to illustrate an embodiment of this invention is to walk through the process of a successful example of authentication by referring to the historic data gathered during the authentication process and the rules by which authentication status is determined. In the example of FIG. 3 the data is charted on a two-axis line graph, where the vertical axis 17 represents the number of bytes read per unit time, and where the horizontal axis 24 represents the passage of time. The line graph itself is an example representation of a signature of a correct authentication data set. The graph indicates that the media spun up from 0 rotations and 0 bytes read per time unit and performance characterization data was gathered 18 on the drive and the media, until point 19 when the detection system of the present invention begins searching for an anomaly signature. At his point, throughout the test, the read performance illustrates an increasing trend. At a certain point 20 the performance begins to decrease. The slope of the historic curve between points 20 and 21 is steeper than the slope of the curve from points 18 to 20.

With reference to FIG. 3, the area immediately to the right of point 20 in which the read performance curve begins to slope downwardly indicates the commencement of an anomaly location. If, for example, the anomaly were caused by a slight conical dent in the media induced by a small circular punch, this location 20 would correspond with the very edge of the depression. As the reading path bisects the conical depression, the height and angle of the depressed surface causes an alteration of the optical path, resulting in slight difficulty in reading that region of the disc and the data corresponding to that region. As explained above, the drive automatically responds by retrying the read operation, and succeeds, but the retry has irrecoverably cost the system a certain degree of performance and so the rate of data transfer continues to drop. (This illustration of an actual anomaly is in contrast with the illustration given below in FIG. 4 of false anomalies where the reading process appears to have slowed, but the data was actually properly read at speed and buffered, and delayed in transit, to arrive all at once in a deferred fashion.) At point 21 the drop in performance is at a low point. At this point 21, the drive is still succeeding in attempted successive reads further into the anomaly location corresponding to the slight conical depression and has reached the area where the optical path alteration is the most severe. In this example, the surface dimple induced by the precise application of the punch was carefully metered and did not achieve the severity of an actual failure to read. After passing through the deepest point of the depression, the reading device continues up the up slope of the depression, and as it approaches the edge of the depression, the effect of the anomaly decreases, and the corresponding return of performance occurs as indicated at point 22 on the curve, as the reading process experiences less difficulty and as the drive firmware performs fewer and fewer retry operations and/or increases drive speed. Finally, at point 22 on the curve, the drive has read beyond the conical depression and is now reading non-anomalous regions, and performance is observed as increasing on a gentle slope characteristic of drives whose reading performance at the inner hub is slower than performance at the outer edge (non-constant-linear-velocity drives). Eventually, at a point on the signature curve to the right of point 23 (not illustrated on the graph) the speed levels off as the drive and media together reach maximum sustained speed and remains at maximum performance until either the read operation ends, or until another anomaly is encountered.

While anomaly locations and their validation are an important aspect, the systems and methods of the present invention are capable of far more than merely identifying media as valid; the validation process can also be used to determine hidden encoded data values. This encoding is achieved using properties of the anomaly locations, for example their absolute and relative locations, their extent, and their severity. For example, a disc with 52 anomaly locations may be used to encode and represent the entire 26 character English alphabet, including lower case and capital letters. The data content of the disc is unrelated to this encoding. In this example, assume that no anomaly produces a fatal read error, and assume that the content of the disc is a software program that calculates one's income tax. Yet the location of each anomaly may be part of a meaningful, higher-level encoding. For example, a distance of one megabyte of data between anomaly locations may represent an encoded "a", a distance of two megabytes between anomaly locations may represent an encoded "b", three megabytes distance an encoded "c", and so on. Further, the anomaly's severity may have meaning, for instance a distance of three megabytes between locations may represent a "c" but only of the anomaly is mild and produces a 25% slowdown in data transfer rate. If the anomaly is more severe and produces a slowdown of between 50% and 75% then it may represent an upper case, or capital, "C". Other embodiments of this encoding technique are equally applicable to the present invention. This encoding technique is sufficient for small quantities of critical data, such as encryption keys and other data items that are important, but not large in size. The encoding is secure because a copy of the original disc cannot represent the slowdown property of the anomaly, and therefore, the critical information is completely lost in the copying process.

Transfer rate is described above as being an important measurement criterion. When the term "transfer rate" is referred to, what is really intended to be measured is the number of bytes transferred in a unit of time. In a real time measurement sense, the number of bytes (or kilobytes, thousands of bytes, or megabytes, millions of bytes) may be referred to as "bytes per second" or "k" per second. In a rolling historic window, looking back across some selected amount of historic time and smoothing, filtering, or averaging the sampled time values, an average, or alternatively, an aggregate transfer rate, is achieved. This aggregate transfer rate is also expressed in bytes per second or other "quantity per unit time" terms, but has been filtered so that performance spikes and deficits that are determined by the filtering logic (described in detail below with reference to FIGS. 4 and 7) to be irrelevant to the determination of anomaly authenticity are removed so as not to skew the measurements. For example, the process may review the prior 15 seconds of read data, and given a sample rate of once per second, have 15 separate transfer rate values to compute. Filtering may be applied, and, as a result, samples 12, 13, and 14 discarded because they are shown to represent a time period when the system was preoccupied with the handling of a network request unrelated to validation of media. Consequently, the system inadvertently starved the input/output system (making sample 12 too small). Immediately thereafter, the buffer again became available and sample 13 represents a burst of data that occurred at a rate that is too fast for the drive to ever reach in performance, and sample 14 represents the end of that burst of too large, too fast data. In this example, the transfer rates of samples 1, 2, 3, 4, 5, 6, 7, 8, 9, 10, 11, and 15, are added together, and the sum divided by 12 to arrive at a meaningful average transfer rate.

Alternatively the aggregate rate could be arrived it in similar historic fashion, where all 15 transfer rate values could be summed and it is assumed that over the 15 second period, the transfer rate was the sum total, because it represents the true output of the drive over that time period, and therefore, the spike in rate at sample 13 is then meaningful because it began and ended within that period and therefore the apparent slowdown in 12 was nulled out by the apparent speedup in samples 13 and 14 so that the overall aggregate data rate represents the device's actual performance during that 15 seconds.

Real-time measurement of the transfer rate requires an intelligent averaging routine capable of filtering out system-induced non-anomaly performance changes, whereas non real-time measurement using a historic "rolling window" looking back some number of units of time can make use of aggregate values because in the fullness of time these non-anomaly rate changes usually nullify each other. After all, in the example given above, the drive did not actually slow down during sample periods 12, 13 and 14, so that once the situation was rectified by sample 15, the historic view back 15 samples provides an accurate reflection of the amount of data the drive was able to transfer in that time period. Note that had there been an actual slowdown during sample periods 12, 13, and 14, assuming that the drive had been previously operating at full speed, the drive would not ever have been able to catch up during the 15 unit sample and the aggregate total would have been lower. The rolling historic window serves as a powerful analytical tool to truly understand and monitor the device data transfer rate.

Figure 4:
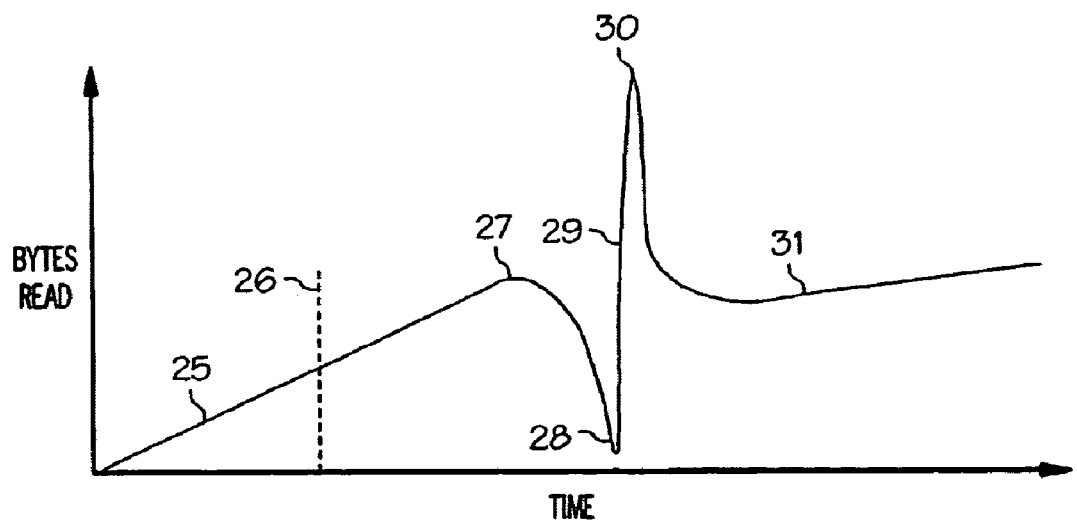
FIG. 4 is a performance history diagram illustrating the process of discriminating between true anomaly locations and apparent anomaly locations caused by system or other non-media events, in accordance with the present invention.

FIG. 4 illustrates historical data related to drive performance for an unsuccessful authentication. The historic data gathered during the authentication process is illustrated and the and the rules by which authentication status is determined are now provided. In this example, the data is illustrated on a two-axis line graph. The graph indicates the media spun up from 0 rotations and 0 bytes read per unit time and performance characterization data is gathered during disk spin up 25 on the drive and the media, until the point 26 where the detection system began looking for an anomaly. Throughout the test, the data read performance demonstrates an increasing trend, and, at a certain point 27 read performance begins to decrease. The absolute value of the slope of the curve between points 27 and 28 is steeper than the slope of the curve between points 25 and 27. The slope of the curve is significant as is the depth of the curve's descent; either or both may be utilized to uniquely identify an anomaly. After the performance anomaly begins to abate, the drive reading performance increases again between points 28 and 29. At point 29 the data transfer rate would have been within the expected range of the prior performance record, but the progression far surpasses that performance with a huge burst of read data, nearly instantaneous, rising to an abrupt peak 30 at many multiples of its previous maximum performance 27. Performance then drops from points 30 to 31 and continues to track the curve of its prior historic performance.

Based on the performance signature disclosed in FIG. 4, this unit of optical media thereby fails to authenticate because the abrupt large scale performance increase or burst 30 immediately after the anomaly 28 was far in excess of the drive's historic ability to read, and may have even been logged as being equivalent to an impossible rate of reading performance by 2001 standards (90×, for instance), proving that the disc and read process itself did not slow down from points 27 to 28, even though it appeared at point 28 to be much slower; the data was buffered and delivered in a burst, at speeds impossible for this drive and this media. Therefore, the anomaly can be deemed unauthentic.

Unauthentic anomalies in this example above may comprise system performance deficits caused by system resource issues other than media readability, resulting in an inadequate input/output subsystem performance. For example the system may fall behind in read requests to a CD drive and return an apparent data rate of 300 kb/sec, when the drive in fact is operating at a rate much faster than that. Eventually when the system releases a portion of its resources to the input/output subsystem controlling the read operation, the pent up read data will burst at rates much higher than the drive would ever be capable of, and the acceleration in increase of transfer rate would occur at a rate that is not physically possible in a rotating media drive. The overall data rate and the rate of acceleration (depth, height, and/or slope as in the discussion of the curve above) have a relationship, one in which a true data rate slowdown causes an overall reduction in the amount of data transferred over time, whereas an apparent but eventually-determined false data transfer rate slowdown caused by external system events such as large network file transfers can be shown to not show such a reduction over time, if the time window is large enough to encompass the entire false slowdown and the corresponding data burst that was buffered too quickly which inevitably follows such a false slowdown. A specific example is the copying of a large file across a network to such a system while the system was in the process of authenticating media. The network transfer might, under some circumstances, result in a temporary slowdown in the apparent reading performance, and it is preferred that the system be able to recognize such occurrences as not being representative of a true anomaly location.

Figure 5:
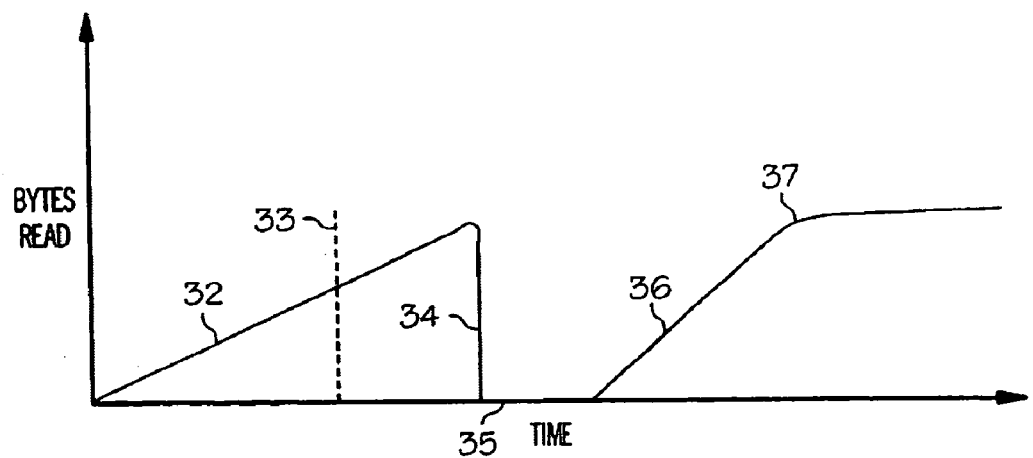
FIG. 5 is a performance history diagram illustrating the process of discriminating between true anomaly locations and apparent (but actually invalid) anomaly locations, in accordance with the present invention.

FIG. 5 illustrates drive performance as a function of time for an embodiment of the present invention during an unsuccessful authentication event. Historic data is gathered during the process and the rules by which authentication status is determined are followed. In this example, the data is illustrated on a two-axis line graph. The graph indicates the media spun up from 0 rotations and 0 bytes read per time unit and performance characterization data is gathered at point 32 on the drive and the media, until the point, for example point 33, at which the detection system begins searching for an anomaly. Throughout the test, the read performance demonstrates an increasing trend, and at a certain point 34, read performance decreases abruptly, with a vertical or near-vertical slope, quickly reaching 0 bytes read per time unit as shown in 35 for some number of time units. If the slope of the curve exceeds a configurable near-vertical threshold slope 34 the anomaly can be deemed unauthentic. An example of such an unauthentic anomaly would arise in a copy of a physically deformed anomalous disc, such as a disc with scratches or dents present on either surface. A copy of such a disc made under a bit-for-bit copying process would contain only the areas of hard error, unreadable data, which are not used by this invention.

For example if one were to take a hammer and nail and punch holes or dents into an optical disc, the areas in the center of the punched hole would probably be full of severe, unrecoverable errors, which would cause a read attempt to time out and return a severe error status. Such areas of destruction are far from ideal for the purpose of this invention, and are preferably not used for authentication purposes because media drives sometimes do not recover from reading such areas, and such areas may be digitally copied with ease anyway, so they offer no added security. The systems and methods of the present invention however, as explained elsewhere in this document, does not make use of such areas of unrecoverable error or data destruction, and is not concerned with them. What can be observed, however, is that immediately adjacent such areas of total destruction are often anomalous slowdown zones, as the reading process begins to scan the region of damage. An ideal implementation of an anomaly would consist exclusively of the data rate slowdown region, and no such unrecoverable errors, but in this example an anomalous area was introduced by non-ideal means and the areas of unrecoverable error are undesirable artifacts. No such area of slowdown cannot be transferred to a copied disc, therefore in a situation where the reading process of an original disc may have been observed to have a sequence of "normal data rate→slowed data rate→hard error, no data rate at all", where "no data rate at all" was not a factor in the authentication logic decision, the copy will be observed to perform as "normal data rate→hard error, no data rate at all" without any such data rate slowdown transition. Since lack of such a data rate slowdown transition by definition means that there are no data rate anomaly zones, no digital copy of a disc can possess anomalous data rate regions.

Only the original disc can exhibit such slowed rates of data transfer in specific locations, such as those bordering any such regions of physical alteration, since present digital disc-copying processes are incapable of making such physical modifications to the resulting output disc copy. In one embodiment, the data associated with points 35, 36, 37 are not used for authentication purposes, since the determination is made as of the processing of data related to point 34 that this anomaly location is not authentic.

Figure 6:
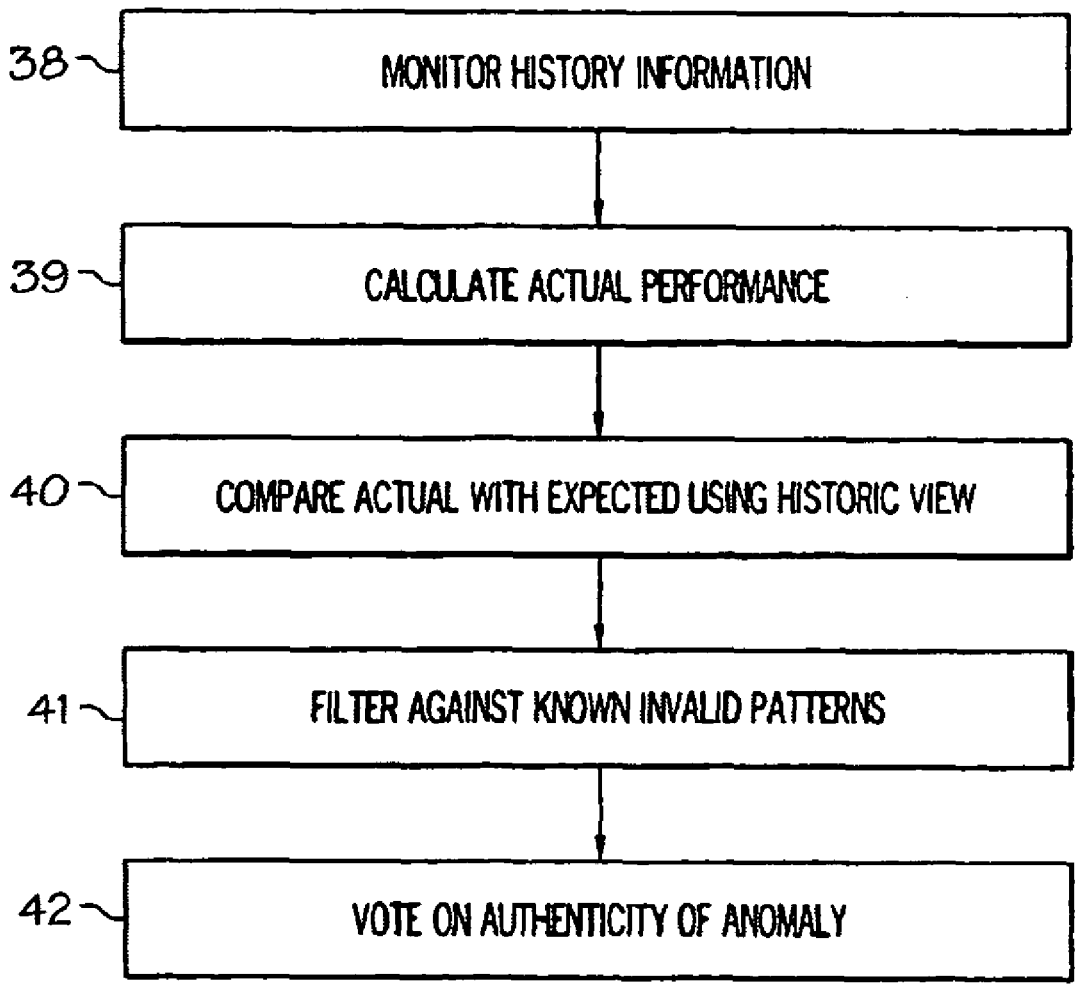
FIG. 6 is a logical flow diagram illustrating an embodiment of the process that discriminates between actual anomaly locations and apparent (but actually invalid) anomaly locations. caused by system events, and non-media related events, in accordance with the present invention.

As shown in FIG. 6 the process of discriminating and filtering as illustrated by example in the discussions of FIG. 3, 4, 5 are illustrated by way of a flow diagram. The historic performance 38 of this media in this drive is analyzed; this can be a small amount of data representing a localized performance window or can be a longer term statistical view, or both, where 39 either or both methods are used in a weighted fashion to execute interim and final decision logic as the validity of the media is determined. Performance may be extrapolated, for example, by monitoring the present rate of increase or decrease of data transfer rate, and using the present rate and a window of its history to create assumptions about what the rate should be in the future. Any subsequent reading performance may be compared with the extrapolated expected performance as based on the historic data 38, and any such current performance data may be compared and filtered against known invalid patterns 41, which involves an authenticity determination by the process described above in the examples illustrated by FIG. 3, 4, 5, and as shown below in the discussion of FIG. 7. Many authenticity indicators may be gathered in this process, and a decision is made 42 depending on the trade-offs made to favor rigorous authentication (potentially more time consuming as it involves the likelihood of more passes, more data read, more data analyzed) versus rapid authentication (which offers a greater risk of inaccuracy because it will force a decision upon the system with less data than rigorous authentication). Indicators may be weighted and compared in a fashion 42 that is not a straightforward comparison-based decision, but rather a formulaic one, based on the rigor criteria set by the content creator whose media is being protected by this system. An example of such a formula is to allow any number of false anomaly locations as in FIG. 4, and authenticate the media when a true anomaly as in FIG. 3 is found, but immediately invalidate the media when a false anomaly as shown in FIG. 5 is found.

In this discussion, terms such as "apparent anomaly", "false anomaly" and "valid or true anomaly" are used. The process of determining whether a region of the media being read is actually an anomaly results in the anomaly being classified as an "apparent anomaly" when it has some of the characteristics of an anomaly but the remainder of the analysis process (involving an evaluation of performance data before, during, and after the suspected anomaly location) indicates otherwise. A "false anomaly" is one which was initially deemed to be "apparent" but then determined by further analysis to be induced either by system issues or counterfeit copies of the original anomalous media. Therefore an anomaly is usually considered "apparent" before subsequently being judged either "authentic/true" or "false". An example of a non-anomaly which may immediately be determined to be "false" without ever being considered "apparent" would arise from the reading of a disc copy made by certain digital copy tools, in which the performance rate drop-off is immediate and results in a transition from the observed aggregate or average rate of a non-anomaly disc to a rate of zero, wherein the drive encounters an unrecoverable error and is unable to read anything from that location. In such cases there is no zone of transition between normal reading and inability to read, no area of performance rate slowdown, and this is a clear indication that the disc is a copy.

Figure 7:
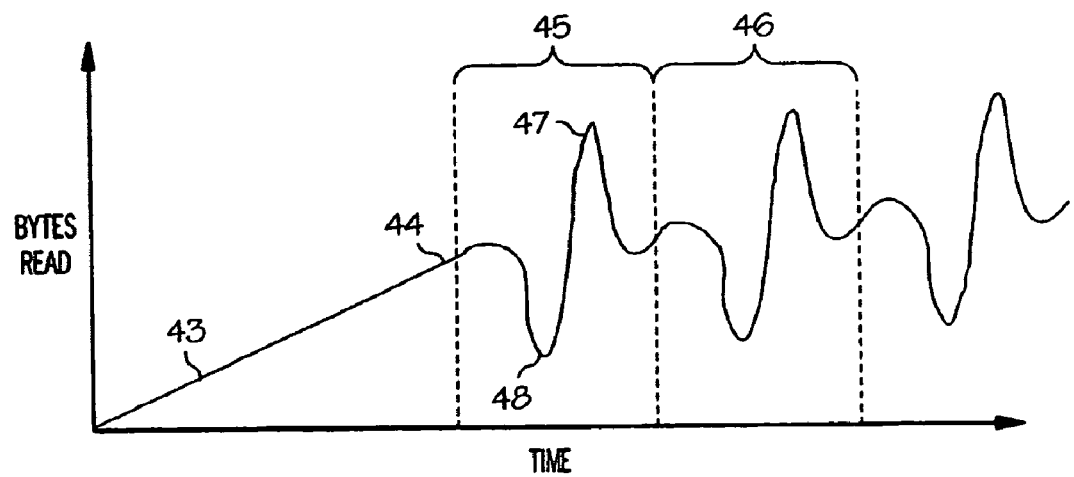
FIG. 7 is a performance history diagram illustrating the process of discriminating between true anomaly locations and apparent (but actually invalid) anomaly locations caused by cyclic system events unrelated to the media, in accordance with the present invention.

As shown in FIG. 7, certain systems can unintentionally induce apparent anomaly readings (later determined with certainty to be "false" anomalies) on any and all media, by the nature of the system's program load and tuning. Systems in some cases may even thrash slightly in a cyclic fashion during certain resource-constrained tasks. As is shown in this illustration, the graph indicates the media spun up from 0 rotations and 0 bytes read per time unit and performance characterization data is gathered 43 on the drive and the media, until the point 44 where the detection system begins looking for an anomaly. Throughout the test, the reading performance demonstrates an increasing trend, and at a certain point reading performance began to decrease, and the slope of the slowdown curve between points 44 and 48 is steeper than the slope of the curve from points 43 to 44. An ideal anomaly is characterized by a known, non-vertical slope indicating a decrease in data transfer performance. So far, this resembles an authentic anomaly, but the curve then progresses toward an excessive performance spike 47 as discussed in FIG. 4. Following this the curve includes a pattern 45 demonstrating a cyclic, repeating nature 46. Such cyclic system resource constraint data can be filtered out as "noise" and the actual media performance signature can then be identified through the noise, even on a system that has a heavy internal and external load and is not capable of running any or all media and drives at full performance at all times. This process allows for real-world usage of this invention, where many systems perform imperfectly and would otherwise introduce such spurious anomaly readings.

The following code example illustrates the process by which real performance anomalies can be discriminated from false or apparent anomalies.

```
/*Three example invention methods for discriminating between real performance anomaly    */
/*locations and those induced by system activity                                         */
if ((bytes-per-time-unit * full-percentage-100-percent) > (current-performance-bytes-per-time-unit * partial-percentage-less-than-100-percent-criterion))
{
    if (last_Normal_Valid == Safe_True) {
    /* Negate possible-performance-anomaly-location if caused by system events outside the media. */
    if ((recent-performance-bytes-per-time-unit * max-percentage-more-than-100-percent) < (bytes-per-time-unit * full-percentage-100-percent)) {
    /* BEFORE USING THIS, we need to be certain that a REAL possible-performance-anomaly-location did not happen!!! */
    /* We use the oldest info's EXPECTED speed vs current and hope its good enough */
    /* We actually cant use the oldest, we need the one BEFORE the oldest in case the */
    /* oldest is positioned directly after a anomaly (common) and the speed at that point */
    /* is a fast buffer burst read (common.). So instead of oldest_Smooth_Ptr use last_Normal_Ptr. */
    if ((recent-expected-bytes-per-time-unit * max-percentage-more-than-100-percent) < (expected-bytes-per-time-unit * full-percentage-100-percent)) {
    /* Above criterion Speed jump from an inter IO latency, rather than a slow IO time.. */
    /* Perhaps this is a problem boundary. */
    /* This buries the hatchet, Instead of modifying old records just start ignoring all IOs from here on */
    /* because of this anomaly. */
    Suspect-Non-Authentic-Anomaly-Area = TRUE_true;
    Why-Do-We-Suspect-Non-Authentic-Anomaly-Area = INSTANT_RATE_JUMP;
```

```
            /* NOTE: Cancelling possible-performance-anomaly-location */
            *possible-performance-anomaly-location_Observed = FALSE_false;
            /*Invalid Anomaly Detected */
            Real_Anomaly = FALSE_false;
            }
    * In case latency was within an IO on edge, we have a second technique. */
    /* As a secondary measure, one way to nullify this possible-performance-anomaly-location is to */
    /* compare the EXPECTED speed to the oldest EXPECTED speed. */
    /* And then after doing so, compare for reasonability against the startup speed. */
    if (((recent-expected-bytes-per-time-unit * max-percentage-more-than-100-percent) < (expected-bytes-per-time-unit * full-percentage-100-percent))
    && ((oldest-expected-blocks-per-time-unit * max-percentage-more-than-100-percent) < (expected-bytes-per-time-unit * full-percentage-100-percent)))
        {
        /* Current expected rate is much faster than older expected rate. Suspicious. */
        False_Speedup_To_Avoid = TRUE_true;
        /* This buries the hatchet, Instead of modifying old records just start ignoring all IOs from here on */
        Suspect-Non-Authentic-Anomaly-Area = TRUE_true;
        Why-Do-We-Suspect-Non-Authentic-Anomaly-Area = EXPECTED_RATE_JUMP;
        /* NOTE: Cancelling possible-performance-anomaly-location */
    *possible-performance-anomaly-location_Observed = FALSE_false;
    /*Invalid Anomaly Detected */
    Real_Anomaly = FALSE_false;
    }
    /* We have a third technique. */
    if ((oldest-expected-bytes-per-time-unit * max-percentage-more-than-100-percent) < (expected-bytes-per-time-unit * full-percentage-100-percent))
        {
        /* Current expected rate is somewhat faster than older expected rate. Suspicious. */
        if ((last_Normal_Ptr->block_Marked_Definite_Anomaly != TRUE_true)
        && (last_Normal_Ptr->block_Marked_Possible_possible-performance-anomaly-location != TRUE_true))
            {
            oldest_Smooth_Ptr->first_False_Speedup_To_Avoid = TRUE_true;
            /* This buries the hatchet, Instead of modifying old records just start ignoring all IOs from here on */
            Suspect-Non-Authentic-Anomaly-Area = TRUE_true;
            Why-Do-We-Suspect-Non-Authentic-Anomaly-Area = INVALID_SLOPE_ON_RATE_CHANGE;
            /* NOTE: Cancelling possible-performance-anomaly-location */
            Real_Anomaly = FALSE_false;
            }
        }
```

In order to capture the data measurements needed to monitor the data transfer rate, low-level access is required for interfacing with, and controlling, system devices. Authors of operating systems and device driver interfaces for computing devices typically allow for standard programmatic access at high levels of indirection from the actual device. This is intended to provide strong general device utility to the typical user, but this architectural indirection can be too abstracted and too far removed from the actual device, making it difficult or impossible to discern actual device performance. For example, a read operation at such a high level of interface might involve a reading process with a 10 megabyte buffer of data at some point but would provide no ability to know how fast each 512 k was read. Therefore, it is preferred that the systems and methods of the present invention find ways to communicate with the device at lower levels than standard interfaces. In many cases it is possible to access documented operating system interfaces at these lower levels and access the device in much the same level of detailed control as the device driver itself. This can be done in a fashion that bypasses the device driver, and at the same time device driver access can be optionally shunted to disallow any other process from using the device during an authentication operation. The following discussion of FIG. 8 and FIG. 9 details the manner in which the systems and method of the present invention can acquire low-level device control on computing devices of all types, including popular consumer operating systems (such as versions of Windows) on consumer computing devices.

Figure 8:
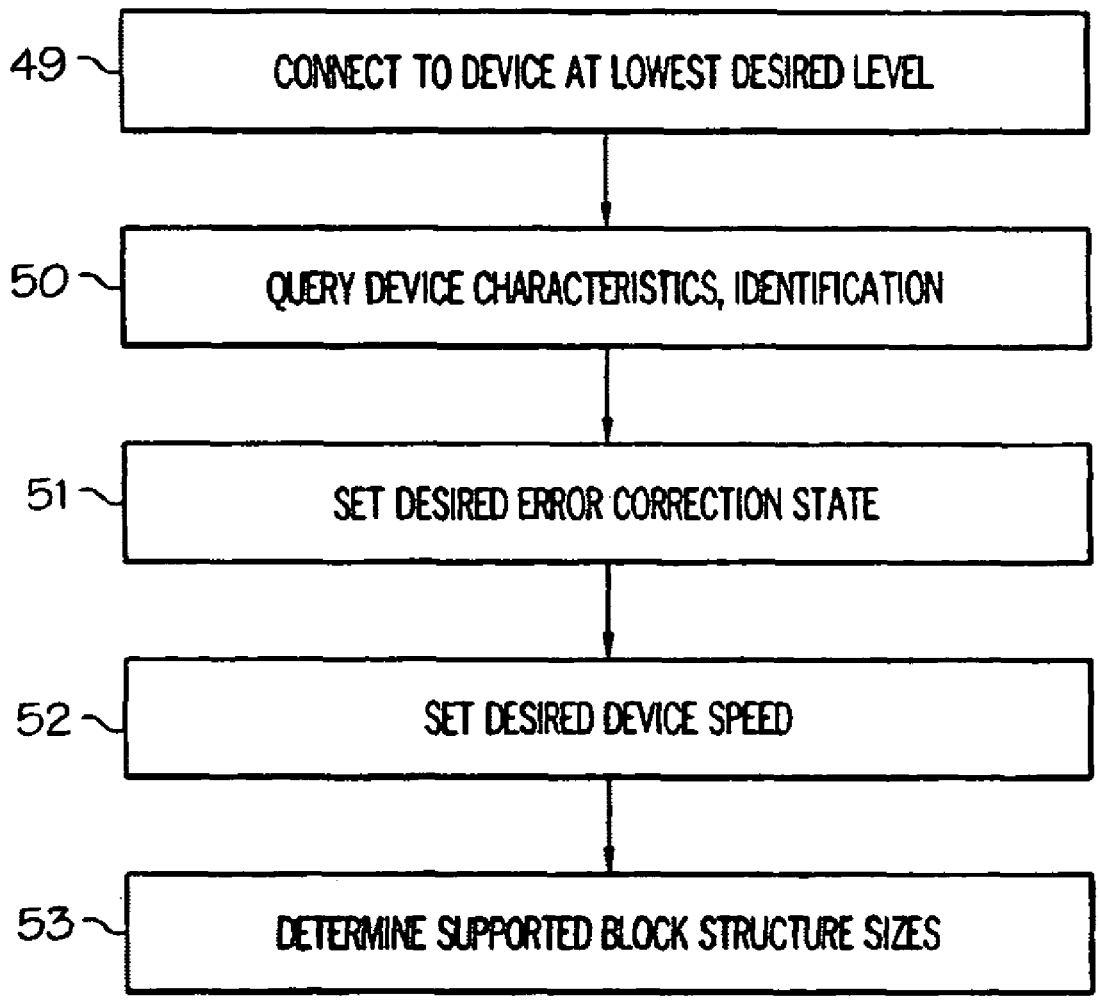
FIG. 8 is a logical flow diagram illustrating a process that queries, initializes, and secures the device itself, and optionally secures a connection to the system driver environment, in accordance with the present invention.
Figure 9:
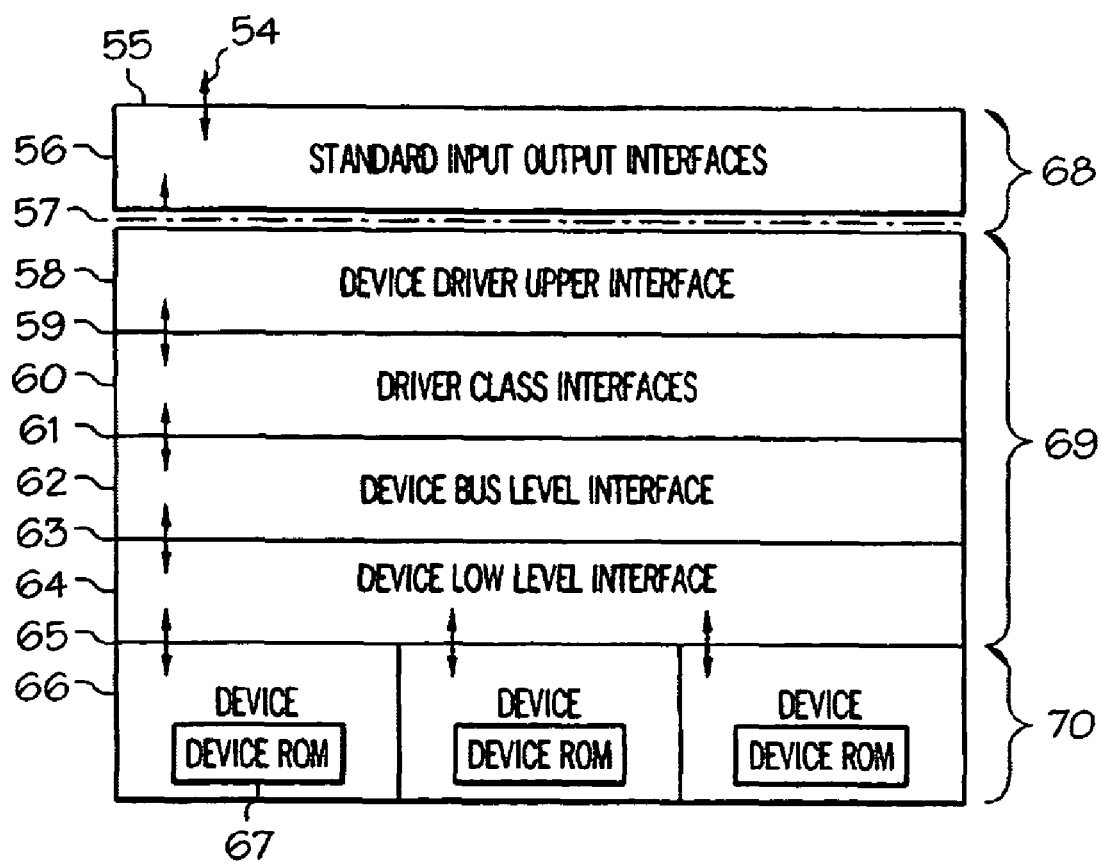
FIG. 9 is a block diagram illustrating the interface and system driver layer and describing the abstracted generalized device and driver architecture of an operating systems for which the systems and methods of the present invention operate within.

The flow diagram of FIG. 8 illustrates the utilization of a device that reads the media at as low a level as required or desired (FIG. 9 illustrates the interface levels that are supported by the current invention). The desired interface level is utilized 49, and then communication with the device begins. Device identity and status are queried 50 and the device is optionally characterized by means of a lookup on the model and performance characteristics, or alternatively, is characterized by real-time performance and command obedience tests. The desired reported device status error correction and handling state is set 51, and the desired performance (reading rate) value is set as allowed by the device and desired by the authentication process. The supported reading buffer sizes are individually tested or extracted from a table of a device models 53 and an optimal performance reading speed setting is made, for example the device may be set to read at its highest speed, or at 16×, or at 8×, or at all of these values in subsequent uses. Different levels of reported device status error correction 51 and reading performance 52 and reading buffer block size 53 can reveal performance anomaly locations; each model and type of drive has different optimal settings. When optimally configured, such a drive can detect an anomaly location quickly, after reading the media for a few seconds (less than 4 on most drives, even with non-optimal settings). Less than optimal settings may result in the necessity to execute multiple test passes, increasing the elapsed time for authentication.

FIG. 9 illustrates a layered driver architecture that exemplifies how the authentication process of the present invention protects the security of authentication data gathering in this example environment by having an intimate knowledge of the devices and interfaces used to connect to these devices. Any such environment is applicable, and driver interface models are supported that differ from this example, as each operating system will have somewhat different driver layering and interface models. In this example, the interfaces are divided into three high-level hierarchical categories; namely, public external interfaces (standard input/output and filesystem access commands) 68, system internal device driver layer interfaces 69 which are commonly documented, and which the operating system creator may or may not enable, support, desire, or allow direct access to, and the physical device itself 70. As shown at arrow 54 input/output transfers to/from the media device occur in a ubiquitous fashion for most programmatic access, as though the device were any type of storage device or filesystem device. Because the device is a specific kind of device (for example a removable optical media drive), the device obeys specific device class commands 55 (for example the command to eject the disc). It also returns status query information at this level 54, 55 but it is usually not clear to the recipient of the information whether the information provided originated at the device, or from a local cache, or was synthesized entirely by the system (as in the case of a virtual device). As will be seen in this explanation, this authentication process of the present invention unique has the unique ability to connect comparatively to the device driver chain at multiple levels and validate the authenticity of the device. The "honesty" of the stream of authentication data is a powerful mechanism, and one that protects the process from being spoofed or fooled by malicious processes or device drivers. This standard input/output interface layer driver 56 supports general I/O requests, but for device specific actions (like eject media commands) it requires the presence of a device specific dynamic driver module 58 whose interface 57 conforms to the Standard I/O subsystem, to allow for certain optimized methods specific to the device. This vendor-created driver may conform to system level interfaces for such drivers 57 which are provided to all vendors of hardware devices to allow them to create appropriate driver support for their devices.

Below the standard input/output and vendor specific drivers are the uppermost extent of device type/class specific driver interfaces 59 (for example, CD versus hard disc versus tape), and the device class/type drivers themselves 60. Below these are the bus level interfaces 59 which reside logically above the bus type layer 60 which defines the bus or connection logical transport type (SCSI, IDE, ATAPI) for example). Below this is the lowest level of the driver model, the low-level device interface 63 and the associated driver code 64. Below that are the hardware interfaces themselves (SCSI, IDE ATAPI, IEEE 1394 (FireWire), USB, PCMCIA ATAPI) 65 and the actual hardware 66 (for example a drive) and within the hardware is the read only memory chip-set (alternatively flash or non-volatile programmable memory) which contains the device's configuration and identification information. As is clear from this example layered driver model, hindrance-free access to the device is primarily gained at the interface levels of 65, 66 and 67 direct to the device's ROM or other onboard storage memory. This carries with it a price, correspondingly more work as each layer is a level of added complexity and detail. However, a preferred embodiment of the present invention provides for maximum security by connecting to the device driver interface chain at the lowest level possible, 65, 66,67 and by also connecting at other upper interface levels 55, 57, 59 for example, and comparing query results. If the device is reporting the same performance and configuration and command information at all levels then that can be used as an indicator that the system is not as likely to be a tampered or compromised system. If the device driver interfaces report different values, then that is a strong indicator of a compromised system and or an emulated device, and protective functions can be invoked (such as refusing to authenticate the media under those circumstances, or by executing an alternative authentication method). This intimate connection to the driver layers and the device provide an excellent view into actual device performance and thereby provide the best possible data for the performance anomaly authentication process.

Figure 10:
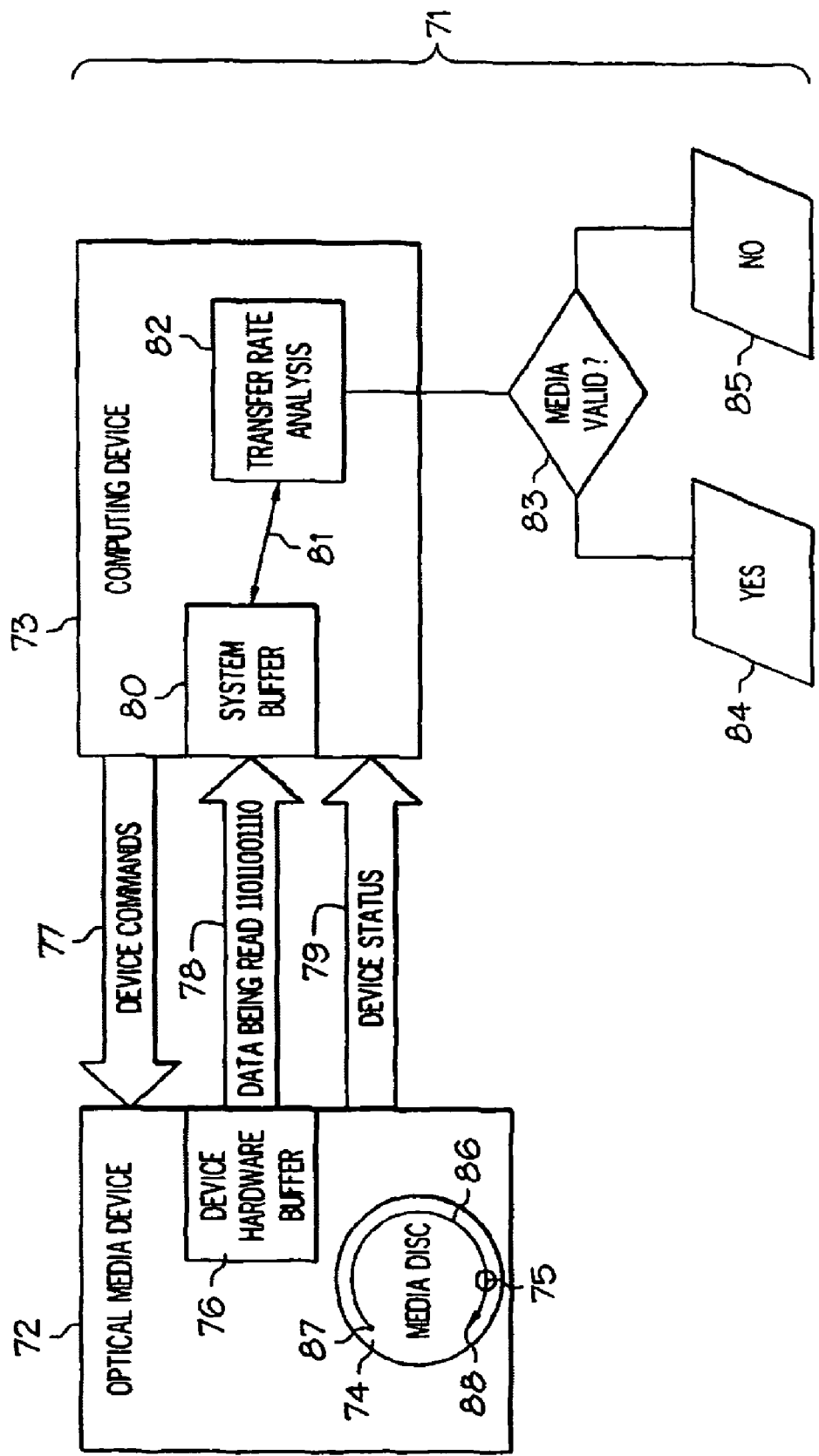
FIG. 10 is a block diagram of a media verification system in accordance with the present invention.

FIG. 10 is a block diagram of a media verification system 71 in accordance with the present invention. The system 71 comprises a computing device 73 and a media reading device 72. The computing device 73 and media reading device 72 may in fact be housed within the same enclosure or alternatively may be housed in separate enclosures connected by an appropriate interface cable (electrical or optical), or wireless interconnect. In either case, the computing device 73 is capable of communicating with the media device 72 in order to send commands 77, receive read data 78, and discern device status 79.

Read data 78 is read from the media disc itself 74, and optionally buffered in a resident physical buffer 76, before passing through a communication channel 78 into an optional system buffer 80 (either dedicated hardware memory within the system, system RAM, or combinations of both in varying amounts). The transfer rate analysis process and system 82 of the present invention 82 performs device control commands, retrieves device status, and reads data from the media reading device 72 using system interfaces 81 at whatever level of privilege required. Upon obtaining device transfer rate performance information by monitoring the data transfer rate 81 over time, the transfer rate analysis unit 82 makes a decision 83 as to whether the disc 74 is an original, and therefore valid, disc 84, or else is a non-authentic copy 85.

The process by which this determination is made, in its simplest form, involves reading data 86 from the optical media 74. The reading process commences at a disc location 87 and ends at second disc location 88 (which may include the entire contents of the disc between them), and the data read 78 is monitored as it is received by the transfer rate analysis unit. If an anomaly 75 is present on the media 88, then the data rate will drop, during the intersection of the extent of read data 86 and the anomaly location 75, as described above.

A more specific example flow is now described with reference to FIG. 10. The transfer rate analysis unit 82 first queries the read device 72 with signal 81, 77 for its current status and settings. When the read device 72 responds with the desired information 79, 81 the transfer rate analysis unit 82 records this information. The read device information is to be used at a later time in order to set the device 72 back to the state it was in before the transfer rate analysis unit 82 began to access it, as a measure of appropriate behavior for driver-level changes performed on a computing system. Failure to do so could cause the system to become instable or otherwise lessen the computing system's usefulness following the authentication process. Once the device status is known and recorded, the device may be commanded to reset itself via commands 81, 77 to a known initial state, to provide a "clean slate" for performance testing. Otherwise the device might retain some state from prior usage, which could cause it to run slower, or exhibit other data rate behaviors that mask the authentication effects that are discerned by the present system. This reset process 81, 77 may take the form of device commands to reset or to reinsert the media or to cycle power, or any other functional command or action which results in a successful re-initialization of the device. This varies by device since some devices have limited firmware, which does not properly execute all commands under all circumstances or may not have certain commands implemented. Similarly, the read device's cache 76, 80 may be flushed, using direct commands from the transfer rate analysis unit 82, or by requesting media reinsertion. In some cases this media reinsertion may be accomplished without opening the drive door, or without having to actually reinsert the disc, as some drives can be commanded to treat the disc as though it had been reinserted.

Once the read device 72 is set to an appropriate and known initial state, commands 81, 77 are issued to select an optimal block size for the device; the determination of what is optimal is done by means of examining the return status 79, 81 of the command and by also attempting to read and examine the actual data rate in response to read commands 78, 81 at various block sizes. When possible, the transfer rate analysis unit 82 gains further control over the device 72 by issuing a device command 81, 77 that requests the device to disable excessive automatic retry attempts. Most read devices can disable some amount of retry operations but their response varies to a degree, even when commanded not to retry. The systems and methods of the present invention are operable regardless of whether the read device 72 ignores or obeys this command. The device's cache 76, 80 is then flushed, by means of direct commands 81, 77 or by causing the device to read an area of the media 74 that is not going to be tested for anomaly behaviors (in other words, in this example of FIG. 10, reading anywhere but between data location 87 and 88). This invention then begins the actual reading and data transfer rate analysis, by starting to read the disc 74 at the beginning of the data locations to be tested 87, reaching optimal sustained transfer speed using low level device reads while approaching the anomaly region 75 to be tested. Upon reaching the potential anomaly region 75, the process discerns that it has begun to test an anomaly, either by having known in a predetermined fashion that the region would be located in a specified absolute disc location 75, or by determining that a slowdown had occurred at the periphery of the location 75 as an anomaly candidate, and then evaluating performance for that location to determine if in fact it is an anomaly location. Note that throughout the process of reading the extent of data 87, 88 the transfer rate for each read 78 at each desired specified block size 77 can be stored for later analysis. Once the full desired extent of data has been traversed 87, 88 and the potential candidate anomaly region has been traversed 75 to the extent that the data rate measured can be shown to have resumed the same order of magnitude of performance as before the potential candidate anomaly location 75 was encountered, the read operations are commanded to cease 81, 77 and the historic data rate statistics collected are analyzed 83, and a determination of authenticity 83 is made 84, 85.

Assuming the disc 74 has multiple anomaly regions 75 these steps may be repeated for each such anomaly 75, and once they have been discovered and determined to be valid, the data resulting form the anomaly regions may also be analyzed to determine if the regions, or their severity, or their positional relationship has any bearing on a hidden encoding value as discussed above. In conjunction with this post-test process of analysis performed by the transfer rate analysis unit 82, the read device 72 may be reset to its prior state by means of device commands 77 so that it can be reliably deployed by other system processes.

The inventive concepts discussed above can be used in conjunction with other copy protection methods that are used to determine the originality of a digital medium and to prevent unauthorized copying thereof. Such methods are disclosed for example in U.S. patent application Ser. No. 9/960,610, filed Sep. 21, 2001, U.S. patent application Ser. No. 9/989,910, filed Nov. 20, 2001, U.S. patent application Ser. No. 10/023,424, filed Dec. 12, 2001, U.S. patent application Ser. No. 10/142,366, filed May 9, 2002, and U.S. patent application Ser. No. 10/773,103, entitled "Systems and Methods for Optical Media Modification", filed Feb. 5, 2004, each being commonly owned with the present application, and the contents of each being incorporated herein by reference in their entirety.

Further to the systems and methods described above for authenticating a medium in response to monitored data transfer rate during the reading of a medium, the following discussion relates to an alternative systems and methods that can be used in replacement of, or in addition to, the above approaches. In the techniques described above, low-level I/O interfaces are employed to measure data throughput, and thereby infer anomaly presence in response to variations in data read rate. However, certain devices are not well-suited for these methods, since they do not produce sufficient variation in data throughput to allow for identification of anomalies.

When reading data from discs containing anomalies, due to the non-deterministic effects of the anomaly, there are data locations within the region of the disc affected by the anomaly where the data read operation appears to vary. In other words, multiple read operations performed on the same region, or segment, of the disk, return different data in these regions. The detection system and method in accordance with the present invention takes advantage of this behavior.

In this approach, a digital signature calculation procedure, for example a message digest algorithm such as MD5, MD2, MD4, SNEFRU, SHA (secure hash algorithm), NIST DSA, HAVAL, N-HASH, and RIPE-MD, and the like, can be employed for this purpose. Digital signature algorithms are commonly employed in computer security operations to procure digital signatures of documents. Changing a single bit in the original document produces an entirely different signature value, and the signature value is always of the same size (usually 128 bits) regardless of the size of the original document. It is noteworthy that message digest algorithms are one-way algorithms in that a digital signature can be produced from a document; however, the document cannot be re-created from the digital signature. Assuming the presence of anomalies in preselected, or known, regions of the disc, particularly anomalies that are known to generate different data during each read procedure, multiple read operations can be performed on the disc in the anomaly regions, and it can be expected that a different digital signature will be produced at each read, owing to the nature of the anomaly, and its effect on the read operation. If the multiple read operations return a digital signature that is different at each pass, then this information can be used to authenticate the medium. Systems and methods for forming such anomalies, in one example, referred to as "borderline" anomalies, are described in U.S. patent application Ser. No. 10/023,424, filed Dec. 12, 2001, and in U.S. patent application Ser. No. 10/773,103, entitled "Systems and Methods for Optical Media Modification", filed Feb. 5, 2004.

In one embodiment, assuming that an authenticating procedure employs the data transfer rate monitoring procedure described above, and assuming that this procedure leads to an inconclusive result, the present digital signature procedure can be utilized to further determine whether an anomaly is present. The two procedures can operate in conjunction with each other to provide a more reliable result. An example of this is provided in the flow diagram of FIG. 11.

Figure 11:
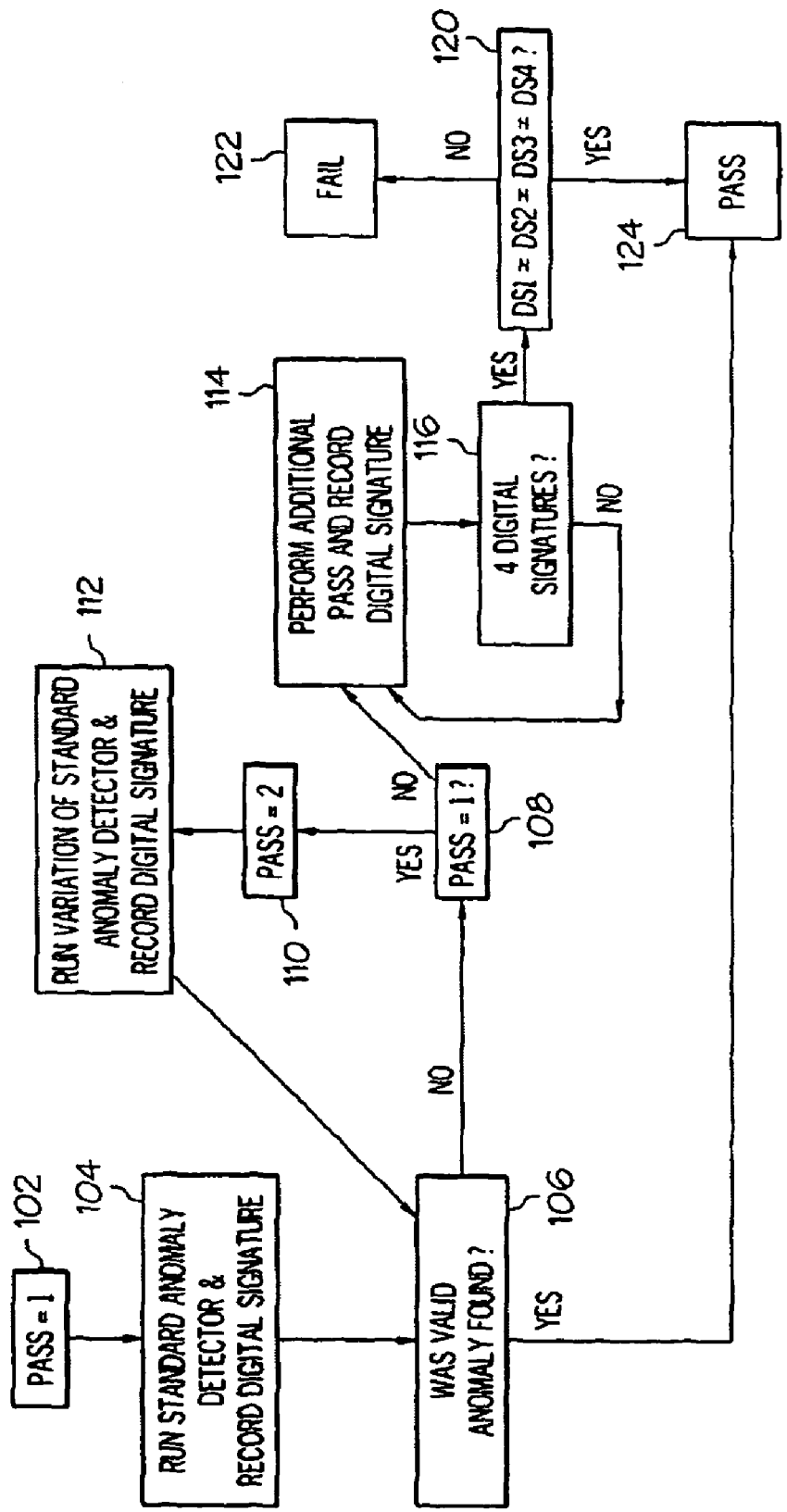
FIG. 11 is a flow diagram of the operation of a transfer rate based procedure operating in conjunction with a digital signature calculation based procedure for determining the presence of an anomaly in a segment of data recorded on a medium, in accordance with the present invention.

In FIG. 11, during a first read of a segment of data believed to contain an anomaly, referred to as the "first pass" at step 102, the standard data transfer rate based anomaly detection procedure described above is performed at step 104 and a first digital signature is calculated based on the data read during the procedure. At step 106, it is determined by the data transfer rate procedure whether the returned data indicates that a valid anomaly was located. If so, the medium is determined as authentic at step 124.

If a valid anomaly is not determined at step 106, it is next determined at step 108 whether the first pass had just been performed, and if so, a second pass of the data is initiated at step 110. During the second pass, a variation of the standard data transfer rate anomaly detection procedure is performed at step 112, and a second digital signature is calculated based on the returned data. The variation of the standard procedure may comprise, for example, a more thorough review of the resulting data, or may investigate other forms of data, for example, the first pass may capture and review a first data structure such as user data, while the second pass may capture and review a second data structure such as sync data, parity data, and the like. It is next determined at step 106 whether the data collected under the second pass of the standard anomaly detection procedure indicates that a valid anomaly is present, and if so, the medium is authenticated at step 124.

If a valid anomaly is not determined upon return to step 106, as a result of two passes of the standard anomaly detection procedure, at steps 104 and 112, an additional pass of the data segment is performed at step 114 and a digital signature is recorded for the data returned from that pass. Next, at step 116, it is determined whether a predetermined number of digital signatures, for example four, have been obtained (in this case, two digital signatures from the earlier passes (pass 1 and pass 2) and one digital signature from the present pass. If not, the procedure returns to step 114 to perform additional passes, and to record additional signatures as a result of the data returned from each pass. If so, the operation continues at step 120, where it is determined whether all of the digital signatures DS1, DS2, DS3, DS4 calculated as a result of each of the passes, have different values. If none of the values are equal, then it is determined that the anomaly is valid, and the disc is authenticated at step 124. However, if any of the digital signatures are determined to be equal, then it is determined that the anomaly is not a valid anomaly, and the disc authentication procedure returns a failure at step 122. In alternative embodiments, the presence of a valid anomaly can be determined based on whether a subset of the digital signatures are equal or not equal.

Pseudocode examples of the above operation are provided as follows. In a first example, the data transfer rate based procedure is initially performed, and a digital signature is calculated, based on the data read during that procedure. If the results of the data transfer rate based procedure are inconclusive, three additional passes of the data segment are made and digital signatures are calculated for each pass. If the resulting digital signatures are all different, it is determined that a valid anomaly has been found. If any of the digital signatures are equal, it is determined that a valid anomaly has not been found.

EXAMPLE 1

```
Example Pseudocode (A):
AnomalyDetect(DriveId, StartBlock, EndBlock)
{
  DetectorInitialize(DetectorData);
  SignatureInitialize(Signature[1]);
  DriveConn = OpenConnectionToDrive(DriveId);
  For CurrBlock = StartBlock to EndBlock
```

-continued

```
  {
    CurrBlockData = ReadBlock(DriveConn, CurrBlock);
    SaveDetectorData(DetectorData, CurrBlockData, BlockSize);
    SignatureUpdate(Signature[1], CurrBlockData, BlockSize);
  }
  SignatureFinalize(Signature[1]);
   Run the standard detection algorithm 
  DetectorResult = RunStandardAnalysis(DetectorData);
  ** Only run the signature test if the results from    **
  ** the standard detection algorithm are inconclusive **
  If (DetectorResult = ResultInconclusive)
  {
    For Pass = 2 to 4
    {
      SignatureInitialize(Signature[Pass]);
      For CurrBlock = StartBlock to EndBlock
      {
        CurrBlockData = ReadBlock(DriveConn, CurrBlock);
        SignatureUpdate(Signature[Pass], CurrBlockData, BlockSize);
      }
      SignatureFinalize(Signature[Pass]);
    }
     If any two signatures are the    
     same, it is not a real anomaly   
    If Signature[1] = Signature[2] OR
      Signature[1] = Signature[3] OR
      Signature[1] = Signature[4] OR
      Signature[2] = Signature[3] OR
      Signature[2] = Signature[4] OR
      Signature[3] = Signature[4]
    {
      DetectorResult = ResultNoAnomaly;
    }
    Else
    {
      DetectorResult = ResultFoundAnomaly;
    }
  }
  If (DetectorResult = ResultNoAnomaly}
  {
    Return Failure;
  }
  If (DetectorResult = ResultFoundAnomaly)
  {
    Return Success;
  }
  Return Unknown;
}
```

A second pseudocode code example is now provided. In this example a first pass of the data segment is made, and it is determined whether a valid anomaly is located. A digital signature is calculated based on the data recorded during this pass. If not, a second pass of the data is made under a variation of the transfer rate based procedure, and it is determined whether a valid anomaly has been found. Digital signatures are calculated for each of the first and second passes. If, after the second pass, a valid anomaly has not been determined, additional third and fourth passes of the data are made and digital signature is calculated for each pass. Again, if none of the digital signatures are equal, it is determined that a valid anomaly has been located.

EXAMPLE 2

```
Example Pseudocode (B):
AnomalyDetect(DriveId, StartBlock, EndBlock)
{
  DetectorInitialize(DetectorData);
  SignatureInitialize(Signature[1]);
```

```
-continued
DriveConn = OpenConnectionToDrive(DriveId);
For CurrBlock = StartBlock to EndBlock
{
    CurrBlockData = ReadBlockMethodA(DriveConn, CurrBlock);
    SaveDetectorData(DetectorData, CurrBlockData, BlockSize);
    SignatureUpdate(Signature[1], CurrBlockData, BlockSize);
}
SignatureFinalize(Signature[1]);
  Run the standard detection algorithm  
DetectorResult = RunStandardAnalysis(DetectorData);
If (DetectorResult = ResultInconclusive)
{
    DetectorInitialize(DetectorData);
    SignatureInitialize(Signature[2]);
    For CurrBlock = StartBlock to EndBlock
    {
        CurrBlockData = ReadBlockMethodB(DriveConn, CurrBlock);
        SaveDetectorData(DetectorData, CurrBlockData, BlockSize);
        SignatureUpdate(Signature[2], CurrBlockData, BlockSize);
    }
    SignatureFinalize(Signature[2]);
    **  Run the standard detection algorithm  **
    DetectorResult = RunStandardAnalysis(DetectorData);
}
**  Only run the signature test if the results from  **
**  the standard detection algorithm Pass 1 and
Pass 2 are inconclusive  **
If (DetectorResult = ResultInconclusive)
{
    For Pass = 3 to 4
    {
        SignatureInitialize(Signature[Pass]);
        For CurrBlock = StartBlock to EndBlock
        {
            CurrBlockData = ReadBlockMethodA(DriveConn, CurrBlock);
            SignatureUpdate(Signature[Pass], CurrBlockData, BlockSize);
        }
        SignatureFinalize(Signature[Pass]);
    }
      If any two signatures are the  
      same, it is not a real anomaly  
    If Signature[1] = Signature[2] OR
       Signature[1] = Signature[3] OR
       Signature[1] = Signature[4] OR
       Signature[2] = Signature[3] OR
       Signature[2] = Signature[4] OR
       Signature[3] = Signature[4]
    {
        DetectorResult = ResultNoAnomaly;
    }
    Else
    {
        DetectorResult = ResultFoundAnomaly;
    }
}
If (DetectorResult = ResultNoAnomaly}
{
    Return Failure;
}
If (DetectorResult = ResultFoundAnomaly)
{
    Return Success;
}
Return Unknown;
}
```

The digital signature analysis described above can be applied to any type of data that results from a media read operation, for example user data, error data, sync, data, parity data, header data, or sub-channel data, for the purpose of determining the presence of a predefined anomaly. The digital signature analysis described above can also optionally be applied to predefined regions of the media in their entirety, or, alternatively, applied to subsections of such regions. The data resulting from a read of each region and subsection can be compared to provide an additional level of reliability.

While this invention has been particularly shown and described with references to preferred embodiments thereof, it will be understood by those skilled in the art that various changes in form and details may be made herein without departing from the spirit and scope of the invention as defined by the appended claims.

We claim:

1. A method for authenticating a removable digital medium by determining the presence of an anomaly region corresponding to a data segment of the removable digital medium comprising: performing multiple read operations on a data segment of the removable digital medium to generate multiple corresponding read data results; calculating corresponding digital signatures using actual data values of underlying data of the read data segment for each of the multiple read data results; determining whether an anomaly region is present in the data segment based on a comparison of the digital signatures by determining whether any of the digital signatures are equal in value, and if a predetermined number of the digital signatures are not equal in value, determining the anomaly region to be present; and authenticating the removable digital medium in response to the determination of the presence of the anomaly region.

2. The method of claim 1 wherein the data comprises data selected from the group consisting of: user data, error data, sync data, parity data, header data, and sub-channel data.

3. The method of claim 1 further comprising monitoring a transfer rate of the read data during at least one of the read procedures, and further determining whether an anomaly region is present in the data segment based on the monitored transfer rate.

4. The method of claim 1 further comprising:
    first monitoring a first transfer rate of first read data during one of the read procedures, and further determining whether an anomaly region is present in the data segment based on the monitored first transfer rate; and
    in the event that the presence of an anomaly is not determined as a result of the first monitoring, second monitoring a second transfer rate of second read data during another of the read procedures, and further determining whether an anomaly region is present in the data segment based on the monitored second transfer rate.

5. The method of claim 1 wherein calculating corresponding digital signatures for each of the multiple read data results comprises calculating a digital signature selected from the group consisting of message digest algorithm 2 (MD2), message digest algorithm 4 (MD4), message digest algorithm 5 (MD5), Snefru, secure hash algorithm (SHA), National Institute of Standards and Technology digital signature algorithm (NIST DSA), Haval, N-Hash, and RACE integrity primitives evaluation message digest (RIPE-MD) digital signatures.

6. The method of claim 1 further comprising, if none of the digital signatures are equal in value, determining the anomaly region to be present.

7. A system for authenticating a removable digital medium by determining the presence of an anomaly region corresponding to a data segment of the removable digital medium comprising: a read unit for performing multiple read operations on a data segment of the removable digital medium to generate multiple corresponding read data results; a calculating unit for calculating corresponding digital signatures using actual data values of underlying data of the read data segment for each of the multiple read data results; and a determining unit for determining whether an anomaly region is present in the data segment based on a comparison of the digital signatures by determining whether any of the digital signatures are equal in value, and if a predetermined number of the digital signatures are not equal in value, the determining unit determining the anomaly region to be present; and a means for authenticating the removable digital medium in response to the determination of the presence of the anomaly region.

8. The system of claim 7 wherein the data comprises data selected from the group consisting of: user data, error data, sync data, parity data, header data, and sub-channel data.

9. The system of claim 7 further comprising a rate monitoring unit for monitoring a transfer rate of the read data during at least one of the read procedures, and further determining whether an anomaly region is present in the data segment based on the monitored transfer rate.

10. The system of claim 7 further comprising:

a monitoring unit for first monitoring a first transfer rate of first read data during one of the read procedures, and further determining whether an anomaly region is present in the data segment based on the monitored first transfer rate; and, in the event that the presence of an anomaly is not determined as a result of the first monitoring, second monitoring a second transfer rate of second read data during another of the read procedures, and further determining whether an anomaly region is present in the data segment based on the monitored second transfer rate.

11. The system of claim 7 wherein the calculating unit calculates a digital signature selected from the group consisting of message digest algorithm 2 (MD2), message digest algorithm 4 (MD4), message digest algorithm 5 (MD5), Snefru, secure hash algorithm (SHA), National Institute of Standards and Technology digital signature algorithm (NIST DSA), Haval, N-Hash, and RACE integrity primitives evaluation message digest (RIPE-MD) digital signatures.

12. The system of claim 7 wherein, if none of the digital signatures are equal in value, the anomaly region is determined to be present.

* * * * *